US008774521B2

United States Patent
Kanda et al.

(10) Patent No.: US 8,774,521 B2
(45) Date of Patent: Jul. 8, 2014

(54) IMAGE PROCESSING APPARATUS, IMAGE PROCESSING METHOD, AND COMPUTER-READABLE RECORDING DEVICE

(75) Inventors: Yamato Kanda, Hino (JP); Makoto Kitamura, Hachioji (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 177 days.

(21) Appl. No.: 13/404,470

(22) Filed: Feb. 24, 2012

(65) Prior Publication Data

US 2012/0251009 A1    Oct. 4, 2012

(30) Foreign Application Priority Data

Mar. 31, 2011   (JP) ................... 2011-080911

(51) Int. Cl.
   *G06K 9/66*       (2006.01)
   *G06T 7/00*       (2006.01)
(52) U.S. Cl.
   CPC ..... *G06T 7/0012* (2013.01); *G06T 2207/30021* (2013.01); *G06T 2207/30096* (2013.01); *G06T 2207/20036* (2013.01)
   USPC ............................ 382/195; 382/128; 382/218
(58) Field of Classification Search
   CPC ... G06K 9/46; G06K 9/00228; G06K 9/3233; G06K 9/00523; G06K 9/4652; G06T 2207/10024; H04N 7/26276
   USPC .......................................... 382/195, 128, 218
   See application file for complete search history.

(56) References Cited

U.S. PATENT DOCUMENTS

2011/0085717 A1*   4/2011   Matsuda .................. 382/128

FOREIGN PATENT DOCUMENTS

| EP | 2 305 091 A1 | 4/2011 |
| JP | 2005-192880 | 7/2005 |
| WO | 2009/154125 A1 | 12/2009 |

OTHER PUBLICATIONS

Li, B., et al., "Computer-based detection of bleeding and ulcer in wireless capsule endoscopy images by chromaticity moments", Computers in Biology and Medicine, 2009, vol. 39, pp. 141-147.
Extended European Search Report dated Oct. 21, 2013 from related European Application No. EP 12 00 1516.9.

* cited by examiner

*Primary Examiner* — Mike Rahmjoo
(74) *Attorney, Agent, or Firm* — Scully, Scott, Murphy & Presser, P.C.

(57) ABSTRACT

An image processing apparatus includes an approximate-surface calculator that calculates multiple approximate surfaces that each approximate the pixel value of a pixel included in an examination-target region of an image; an approximate-surface selector that selects at least one approximate surface from the approximate surfaces on the basis of the relation between the pixel value of the pixel in the examination-target region and the approximate surfaces; an approximate-region setting unit that sets an approximate region that is approximated by at least the selected one approximate surface; and an abnormal-region detector that detects an abnormal region on the basis of the pixel value of a pixel in the approximate region and the value corresponding to the coordinates of that pixel on at least one approximate surface.

7 Claims, 20 Drawing Sheets

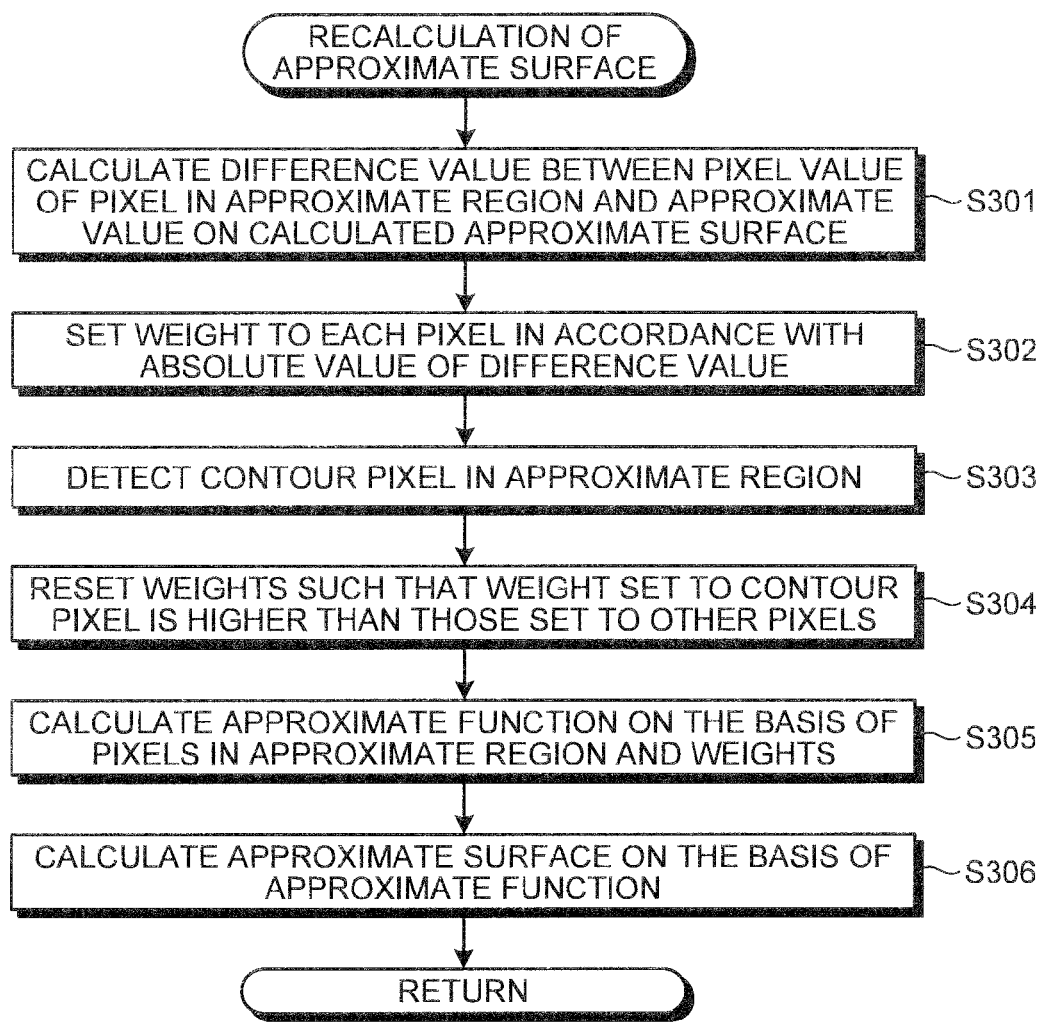

IMAGE PROCESSING APPARATUS, IMAGE PROCESSING METHOD, AND COMPUTER-READABLE RECORDING DEVICE

CROSS-REFERENCE TO RELATED APPLICATIONS

This application is based upon and claims the benefit of priority from Japanese Patent Application No. 2011-080911, filed on Mar. 31, 2011, the entire contents of which are incorporated herein by reference.

BACKGROUND OF THE INVENTION

1. Field of the Invention

The present invention relates to an image processing apparatus that detects an abnormal region from an image, an image processing method, and a computer-readable recording device.

2. Description of the Related Art

There are conventional technologies for reducing the burden on doctors, or the like, who observe an in-vivo image that is obtained by capturing an image of the inside of the body (the lumen) of a subject by using a medical observation apparatus, such as an endoscope, capsule endoscope, or the like. One technology is for detecting an abnormal region, such as a bleeding site, from an image (for example, see Japanese Laid-open Patent Publication No. 2005-192880). Japanese Laid-open. Patent Publication No. 2005-192880 discloses that each pixel of the image or each rectangular region obtained by dividing the image is first mapped into a feature space based on color information, clustering is performed on the feature space, normal mucosa clusters and abnormal region clusters are identified on the basis of information, such as the size of each cluster or the coordinates of the center of gravity, and then the pixels or rectangular regions belonging to abnormal region clusters are detected as an abnormal region. The color information is a pixel value (R, G, B) or a value calculated from the pixel value. The color information may be the chromaticity obtained by R/(R+G+B), G/(R+G+B), or the like, or the color ratio obtained by R/G, or the like.

SUMMARY OF THE INVENTION

An image processing apparatus according to an aspect of the present invention includes: an approximate-surface calculator that calculates multiple approximate surfaces that approximate a pixel value of a pixel included in an examination-target region of an image; an approximate-surface selector that selects at least one approximate surface from the approximate surfaces on the basis of the relation between a pixel value of a pixel in the examination-target region and the approximate surfaces; an approximate-region setting unit that sets an approximate region where the pixel value of the pixel is approximated by at least the selected one of the approximate surfaces; and an abnormal-region detector that detects an abnormal region on the basis of a pixel value of a pixel in the approximate region and a value at the coordinates of the pixel on at least the selected one of the approximate surfaces.

An image processing method according to another aspect of the present invention includes: calculating multiple approximate surfaces that approximate a pixel value of a pixel included in an examination-target region of an image; selecting at least one approximate surface from the approximate surfaces on the basis of the relation between a pixel value of a pixel in the examination-target region and the approximate surfaces; setting an approximate region where a pixel value of the pixel is approximated by at least the selected one of the approximate surfaces; and detecting an abnormal region on the basis of a pixel value of a pixel in the approximate region and a value at the coordinates of the pixel on at least the selected one of the approximate surfaces.

A computer-readable recording device according to still another aspect of the present invention has an executable program stored thereon, wherein the program instructs a processor to execute: calculating multiple approximate surfaces that approximate a pixel value of a pixel included in an examination-target region of an image; selecting at least one approximate surface from the approximate surfaces on the basis of the relation between a pixel value of a pixel in the examination-target region and the approximate surfaces; setting an approximate region where a pixel value of the pixel is approximated by at least the selected one of the approximate surfaces; and detecting an abnormal region on the basis of a pixel value of a pixel in the approximate region and a value at the coordinates of the pixel on at least the selected one of the approximate surfaces.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 28 is a flowchart that illustrates an operation of an approximate-surface re-calculator illustrated in FIG. 25.

DETAILED DESCRIPTION OF THE PREFERRED EMBODIMENTS

An image processing apparatus, an image processing method, and a computer-readable recording device according to exemplary embodiments of the present invention are explained in detail below with reference to the accompanying drawings. The present invention is not limited to these embodiments. Components that are the same in each drawing are denoted by the same reference marks.

The image processing apparatuses according to the embodiments described below process an in-vivo image that is obtained by capturing an image of the inside of the body (the lumen) of a subject by using a medical observation apparatus, such as an endoscope or capsule endoscope. Specifically, the image processing apparatuses perform a process to detect, from an in-vivo image, a region that is an abnormal region that displays a change in the pixel value that is different from those of the surrounding pixels. In the following embodiments, an in-vivo image that is subjected to image processing is, for example, a color image with pixels that each have a pixel level (pixel value) corresponding to each color component, i.e., R (red), G (green), and B (blue).

First Embodiment

Figure 1:
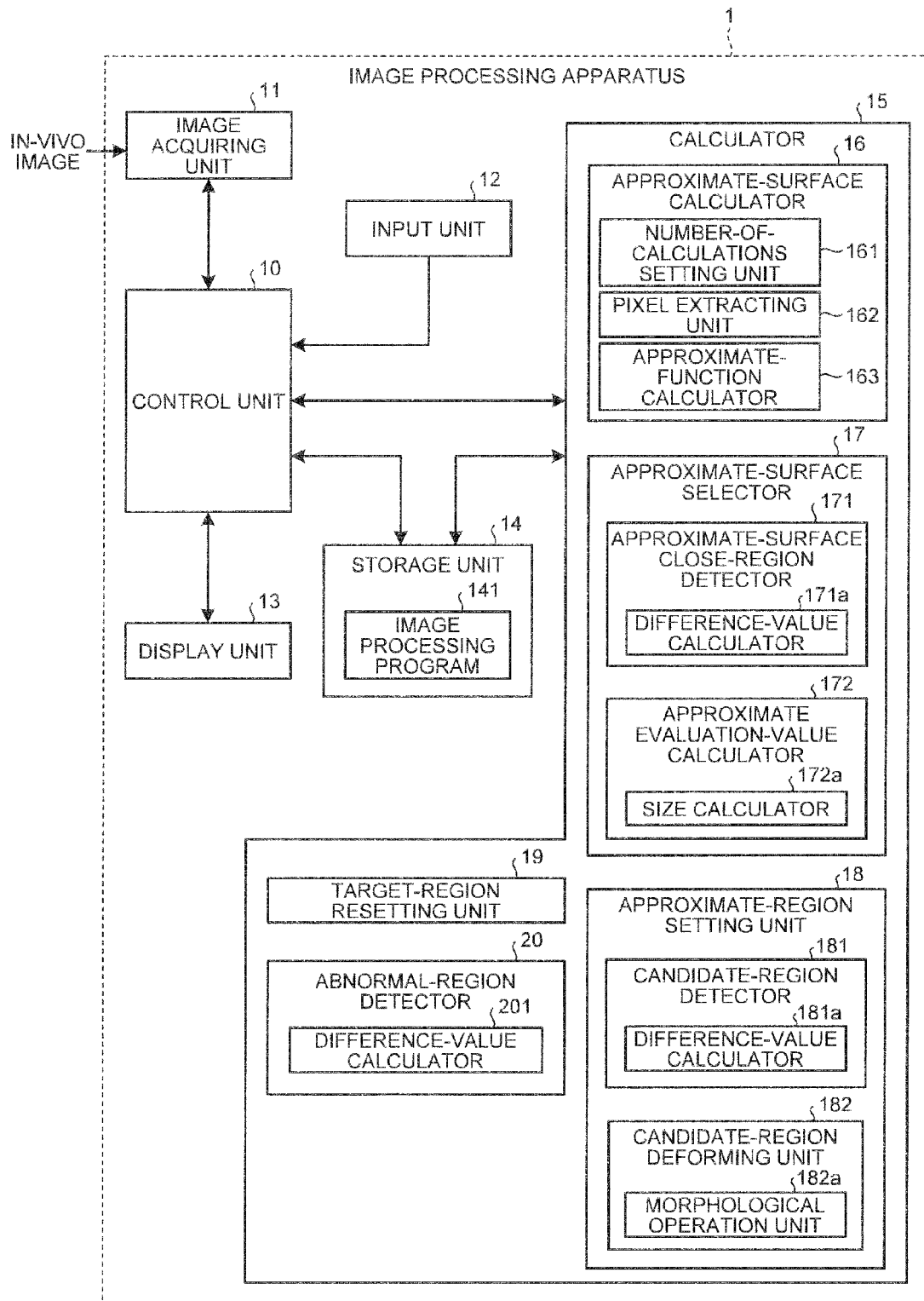
FIG. 1 is a block diagram that illustrates the configuration of an image processing apparatus according to a first embodiment of the present invention.

FIG. 1 is a block diagram that illustrates the configuration of an image processing apparatus according to a first embodiment of the present invention. An image processing apparatus 1 illustrated in FIG. 1 includes a control unit 10 that controls the overall operation of the image processing apparatus 1; an image acquiring unit 11 that acquires image data on an in-vivo image, which is captured by a medical observation apparatus; an input unit 12 that receives an input signal that is input from an external source; a display unit 13 that performs various types of displaying; a storage unit 14 that stores therein image data acquired by the image acquiring unit 11 and various programs; and a calculator 15 that performs predetermined image processing on image data.

The control unit 10 is implemented using hardware, such as a CPU. The control unit 10 reads various programs stored in the storage unit 14 so as to give a command, transfer data, or the like, to each unit included in the image processing apparatus 1 in accordance with image data input from the image acquiring unit 11, an operating signal input from the input unit 12, or the like. Thus, the control unit 10 controls the overall operation of the image processing apparatus 1 in an integrated manner.

The image acquiring unit 11 is configured as appropriate depending on the form of the system that includes the medical observation apparatus. For example, if the medical observation apparatus is a capsule endoscope and if a portable recording medium is used to transfer image data between the image acquiring unit 11 and the medical observation apparatus, the image acquiring unit 11 is configured as a reader to which the recording medium is removably attached and that reads stored image data on an in-vivo image. If a server is installed that stores image data on an in-vivo image captured by the medical observation apparatus, the image acquiring unit 11 is configured as a communication device, or the like, that is connected to the server so as to acquire image data on an in-vivo image via data communication with the server. Alternatively, the image acquiring unit 11 may be configured as an interface device, or the like, that receives image signals from a medical observation apparatus, such as an endoscope, via a cable.

The input unit 12 is implemented by using an input device, such as a keyboard, mouse, touch panel, or various switches. The input unit 12 receives an input signal and outputs the signal to the control unit 10.

The display unit 13 is implemented by using a display device, such as an LCD or EL display. The display unit 13 displays various screens, which contain an in-vivo image, under the control of the control unit 10.

The storage unit 14 is implemented by using, for example, various IC memories, i.e., ROM or RAM, such as a rewritable flash memory; by using an internal hard disk drive or a hard disk drive connected via a data communication terminal; or by using an information recording device, such as a CD-ROM, or a reading device for the recording medium. In addition to image data on an in-vivo image acquired by the image acquiring unit 11, the storage unit 14 stores therein programs for operating the image processing apparatus 1 and for causing the image processing apparatus 1 to perform various functions, data to be used when theses programs are executed, or the like. Specifically, the storage unit 14 stores therein an image processing program 141 for performing a process to detect an abnormal region from an in-vivo image.

The calculator 15 is implemented by using hardware, such as a CPU. The calculator 15 reads the image processing program 141 so as to process image data on an in-vivo image and so as to perform various calculation operations to detect an abnormal region from an in-vivo image.

Next, an explanation is given of the detailed configuration of the calculator 15.

The calculator 15 includes an approximate-surface calculator 16 that calculates, on the basis of the pixel values (e.g., the G-component pixel values) of pixels included in an examination-target region of the in-vivo image, multiple approximate surfaces that approximate the pixel values of the pixels included in the examination-target region; an approximate-surface selector 17 that selects at least one approximate surface from the multiple approximate surfaces; an approximate-region setting unit 18 that sets an approximate region that is approximated by the selected approximate surface; a target-region resetting unit 19 that sets, as a new examination-target region, a region of the in-vivo image other than the set approximate region and that performs control so as to repeat a series of processes from the calculation of an approximate surface to the setting of an approximate region; and an abnormal-region detector 20 that detects an abnormal region from an in-vivo image on the basis of the pixel value of a pixel in the approximate region and the value at the coordinates of that pixel on the approximate surface.

The approximate-surface calculator 16 includes a number-of-calculations setting unit 161 that sets the number of times calculations of approximate surfaces are performed; a pixel extracting unit 162 that extracts multiple pixels, which are to be used for the calculation of each approximate surface, from the examination-target region; and an approximate-function calculator 163 that calculates an approximate function that approximates the pixel values of the extracted pixels. The approximate-surface calculator 16 acquires an approximate surface by using the calculated approximate function.

The approximate-surface selector 17 includes an approximate-surface close-region detector 171 that detects, for each approximate surface, a region (hereafter, referred to as an approximate-surface close region) where the pixel values of pixels in the examination-target region are close to the values (hereafter, simply referred to as approximate values) at the coordinates of the respective pixels on the approximate surface; and includes an approximate evaluation-value calculator 172 that calculates an evaluation value to evaluate the degree of approximation of an approximate surface in the approximate-surface close region. The approximate-surface selector 17 selects at least one approximate surface from multiple approximate surfaces on the basis of the calculated evaluation value. The above-described approximate-surface close-region detector 171 includes a difference-value calculator 171a that calculates the difference value between the pixel value and the approximate value. The approximate-surface close-region detector 171 detects an approximate-surface close region on the basis of the difference value. Furthermore, the above-described approximate evaluation-value calculator 172 includes a size calculator 172a that calculates the size (area) of an approximate-surface close region. The approximate evaluation-value calculator 172 calculates this size as an evaluation value.

The approximate-region setting unit 18 includes a candidate-region detector 181 that detects a predetermined pixel region from the examination-target region as a candidate region of an approximate region (hereafter, referred to as an approximate candidate region); and includes a candidate-region deforming unit 182 that deforms an approximate candidate region so that the approximate candidate region includes a specific region inside the approximate candidate region or includes a region that is outside the approximate candidate region and is adjacent to the approximate candidate region. The approximate-region setting unit 18 sets the modified approximate candidate region as an approximate region. The candidate-region detector 181 includes a difference-value calculator 181a that calculates the difference value Δz of the approximate value z' at the coordinates of each pixel. The candidate-region detector 181 detects a candidate region on the basis of the difference value. The candidate-region deforming unit 182 includes a morphological operation unit 182a that performs a morphological operation on a candidate region.

The abnormal-region detector 20 includes a difference-value calculator 201 that calculates the difference value between the pixel value and the approximate value. The abnormal-region detector 20 detects an abnormal region on the basis of the difference value.

Figure 2:
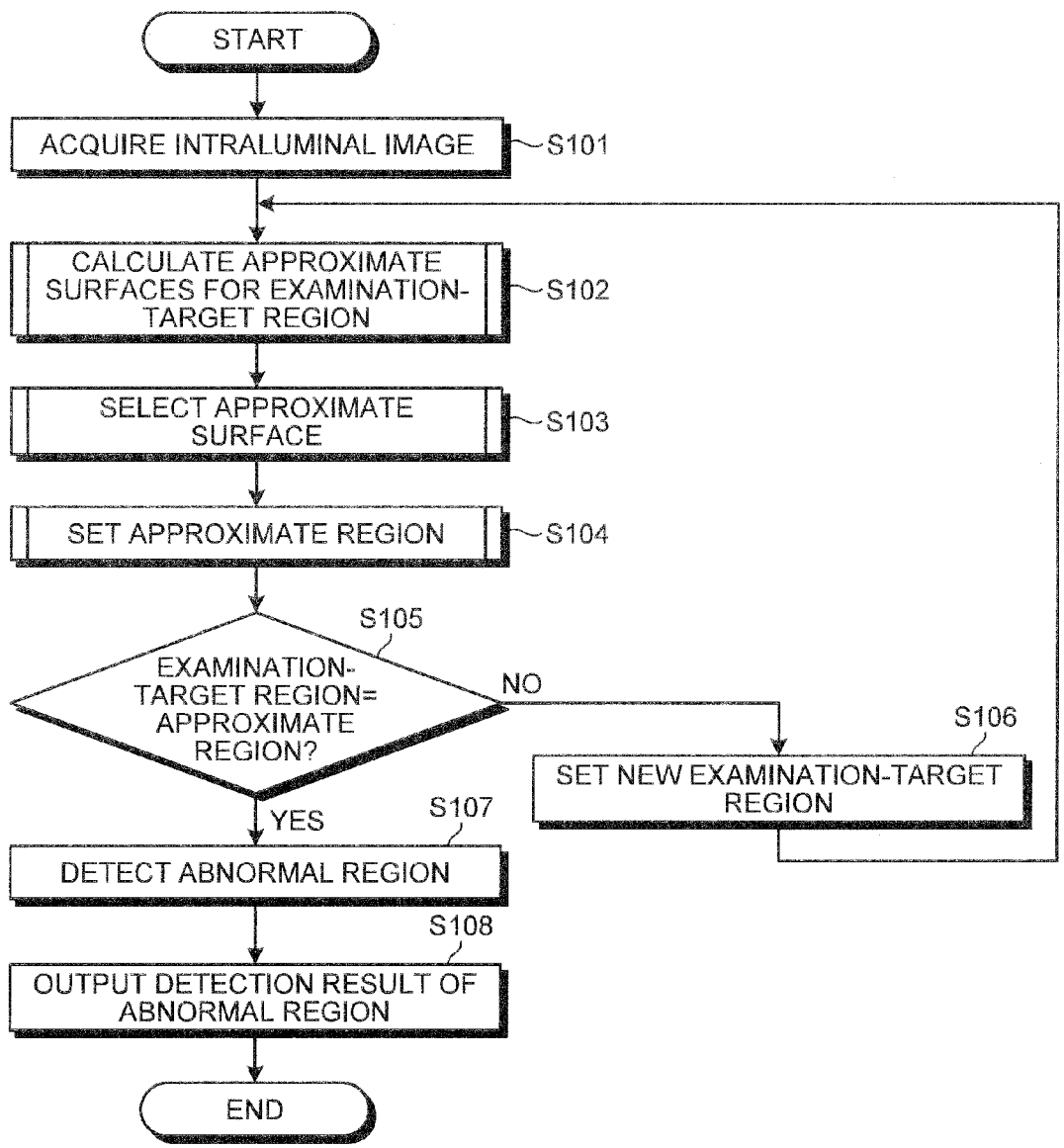
FIG. 2 is a flowchart that illustrates an operation of the image processing apparatus illustrated in FIG. 1.

Next, an explanation is given of an operation of the image processing apparatus 1. FIG. 2 is a flowchart that illustrates an operation of the image processing apparatus 1.

Figure 3:
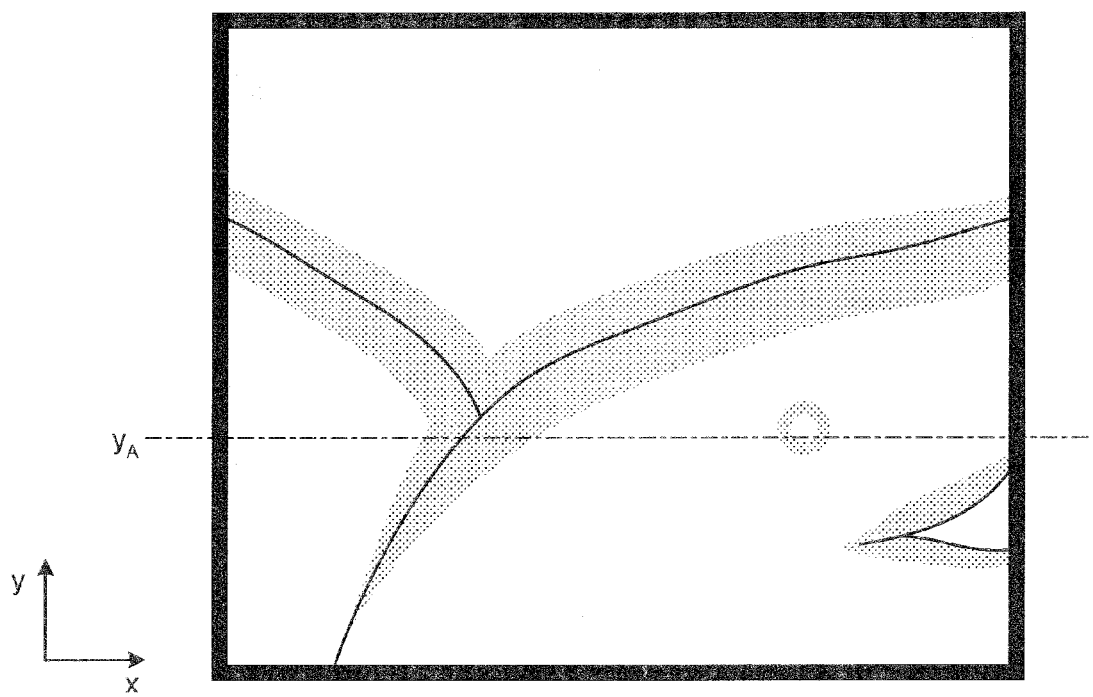
FIG. 3 is a schematic diagram that illustrates an exemplary image loaded into the image processing apparatus illustrated in FIG. 1.
Figure 4:
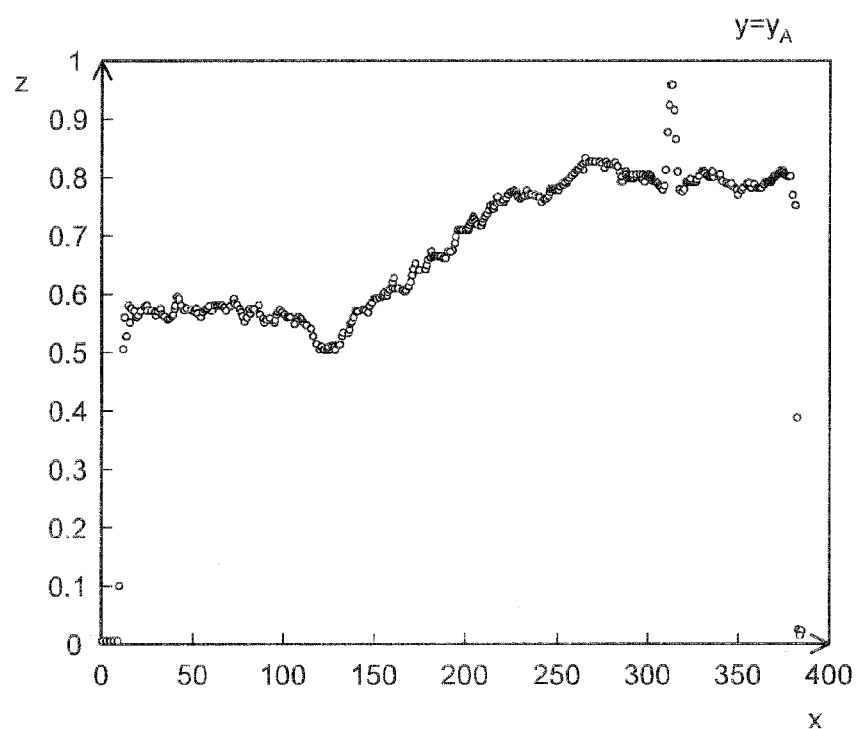
FIG. 4 is a graph that illustrates the pixel values z in the x direction, where $y=y_A$, as illustrated in FIG. 3.

First, at Step S101, the image acquiring unit 11 acquires a group of in-vivo images from an external source and stores the images in the storage unit 14. The calculator 15 sequentially reads an image, on which image processing is to be performed, from the storage unit 14. FIG. 3 is a schematic diagram that illustrates an exemplary image read from the storage unit 14. In the following, the coordinates of each pixel included in an image 100 illustrated in FIG. 3 are represented by (x, y). FIG. 4 is a graph that illustrates the pixel values z in the x direction, where $y=y_A$, as illustrated in FIG. 3. In order to assist with the understanding of the operation principle, an explanation is given below with reference to a two-dimensional representation that contains the one-dimensional coordinates (x-coordinates) of pixels and the pixel values z. The pixel value z is normalized such that the maximum value is 1.

Figure 5:
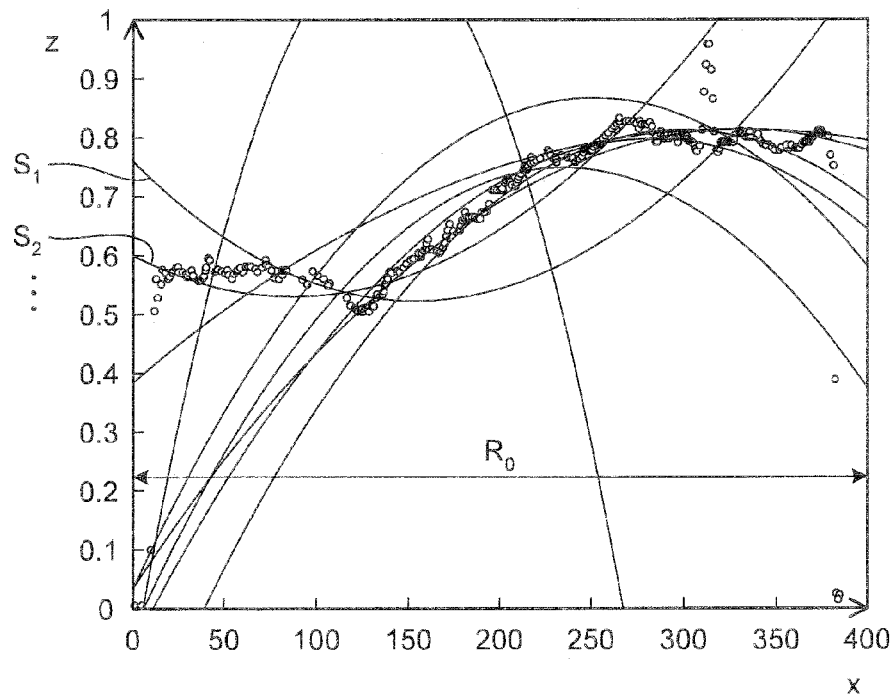
FIG. 5 is a graph that illustrates a process for calculating an approximate surface.

At Step S102, the approximate-surface calculator 16 calculates multiple approximate surfaces $S_1, S_2, \ldots$ that approximate the pixel values of pixels in the examination-target region, as illustrated in FIG. 5. Initially, the entire image 100 (indicated by the region $R_0$ in the x direction) is set as the examination-target region. A detailed explanation is given later of a process for calculating approximate surfaces.

Figure 6:
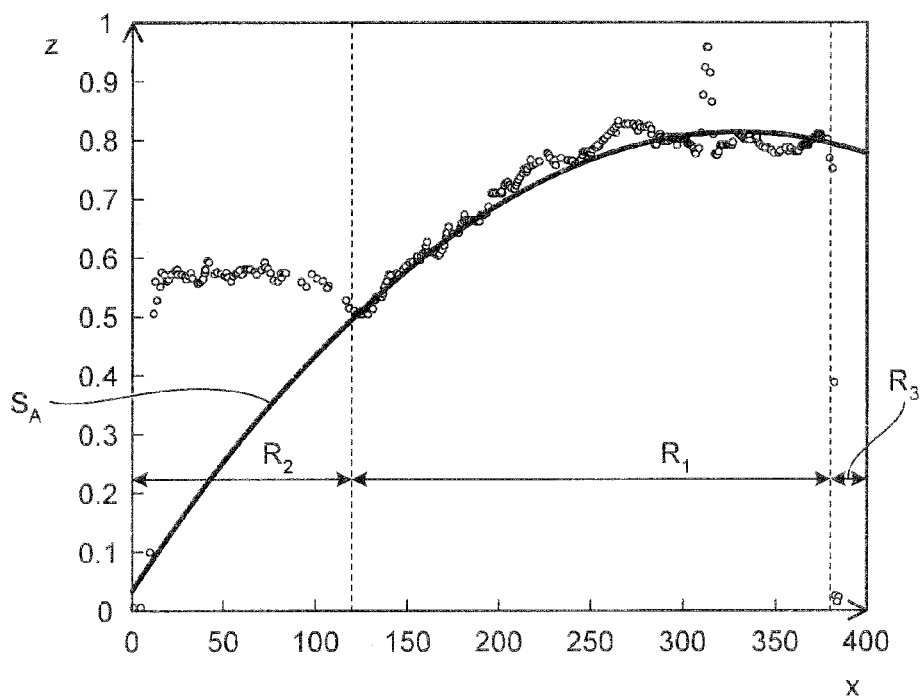
FIG. 6 is a graph that illustrates a process for selecting an approximate surface and setting an approximate region.

Then, at Step S103, the approximate-surface selector 17 selects, from multiple approximate surfaces, at least one approximate surface that has as large a region as possible where the pixel values of pixels in the examination-target region are close to the approximate values at the coordinates of the respective pixels. For example, the approximate surface $S_A$ illustrated in FIG. 6 is selected from the approximate surfaces $S_1$ to $S_N$ illustrated in FIG. 5.

At Step S104, the approximate-region setting unit 18 sets, for each approximate surface selected by the approximate-surface selector 17, an approximate region where the pixel values of the pixels in the examination-target region are approximated. For example, the region $R_1$ is set as an approximate region with respect to the approximate surface $S_A$ illustrated in FIG. 6.

At Step S105, the target-region resetting unit 19 determines whether the approximate region set by the approximate-region setting unit 18 matches the entire examination-target region. If the approximate region does not match the examination-target region (No at Step S105), the target-region resetting unit 19 sets a region other than the set approximate region as a new examination-target region (Step S106). For example, the region $R_1$, which has been set as the approximate region, is part of the initially set examination-target region $R_0$ ($R_1 \neq R_0$). Therefore, in this case, the regions $R_2$ and $R_3$ are set as the next examination-target regions.

Afterwards, the process returns to Step S102. Then, a process is performed to calculate multiple approximate surfaces $S_1', S_2', \ldots$ (see FIG. 7) for each of the newly set regions $R_2$ and $R_3$ and to select at least one approximate surface (e.g., the approximate surface $S_B$) from them. Furthermore, a process is performed to set an approximate region $R_4$, which is approximated by the approximate surface $S_B$ (see FIG. 8).

The above process is repeated so that it is possible to obtain the approximate surface $S_A$ (the region $R_1$), the approximate surface $S_B$ (the region $R_4$), the approximate surface $S_C$ (the region $R_3$), the approximate surface $S_D$ (the region $R_5$), and the approximate surface $S_E$ (the region $R_6$), which approximate the pixel values z of pixels included in the image 100. Information about these approximate surfaces and approximate regions is stored in the storage unit 14.

If the approximate region matches the examination-target region, i.e., if approximate regions have been set for all the regions of the image 100 (Yes at Step S105), the abnormal-region detector 20 performs a process to detect an abnormal region from the in-vivo image (Step S107).

Figure 9:
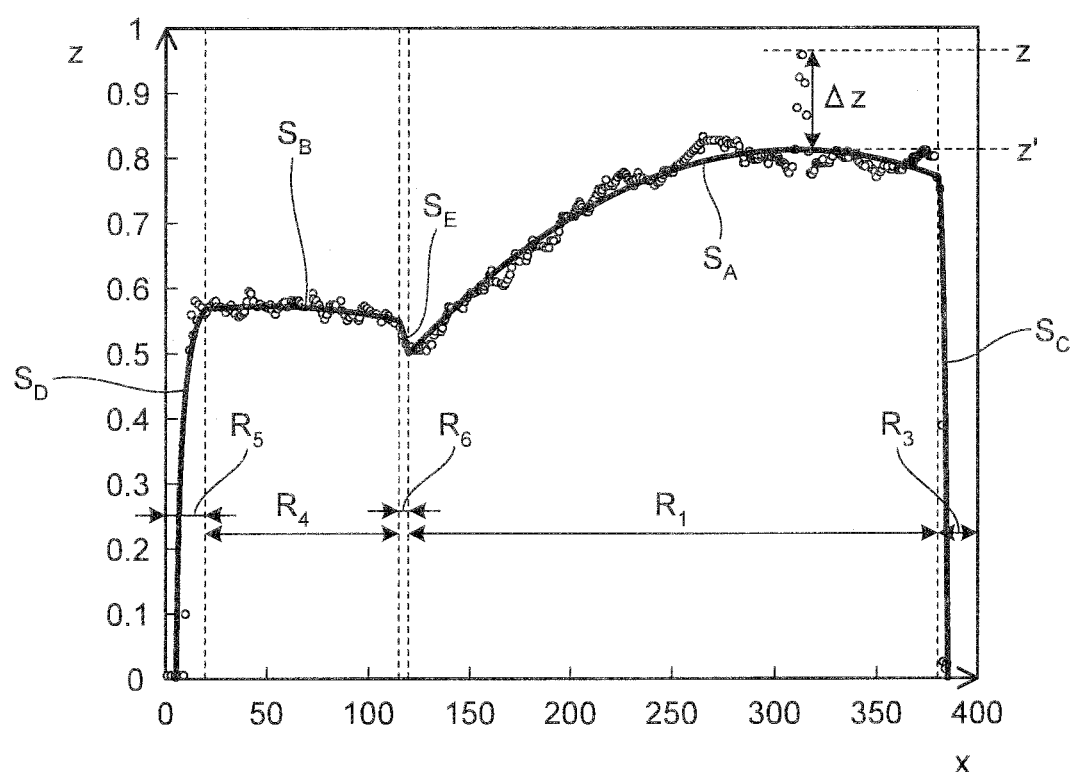
FIG. 9 is a graph that illustrates a process for detecting an abnormal region.

Specifically, the abnormal-region detector 20 calculates the difference value $\Delta z$ ($\Delta z = z - z'$) between the pixel value z of a pixel in the approximate region and the approximate value z' at the coordinates of that pixel (See FIG. 9). The abnormal-region detector 20 then detects a region where the difference value is greater than or equal to a predetermined threshold as an abnormal region.

The difference value $\Delta z$ may be newly calculated or may be acquired from the storage unit 14 if the value has been calculated during the previous process and stored in the storage unit 14.

At Step S108, the calculator 15 outputs the detection result of the abnormal region and stores the result in the storage unit 14. The display unit 13 may display the output detection result on a display in a predetermined format under the control of the control unit 10.

Figure 10:
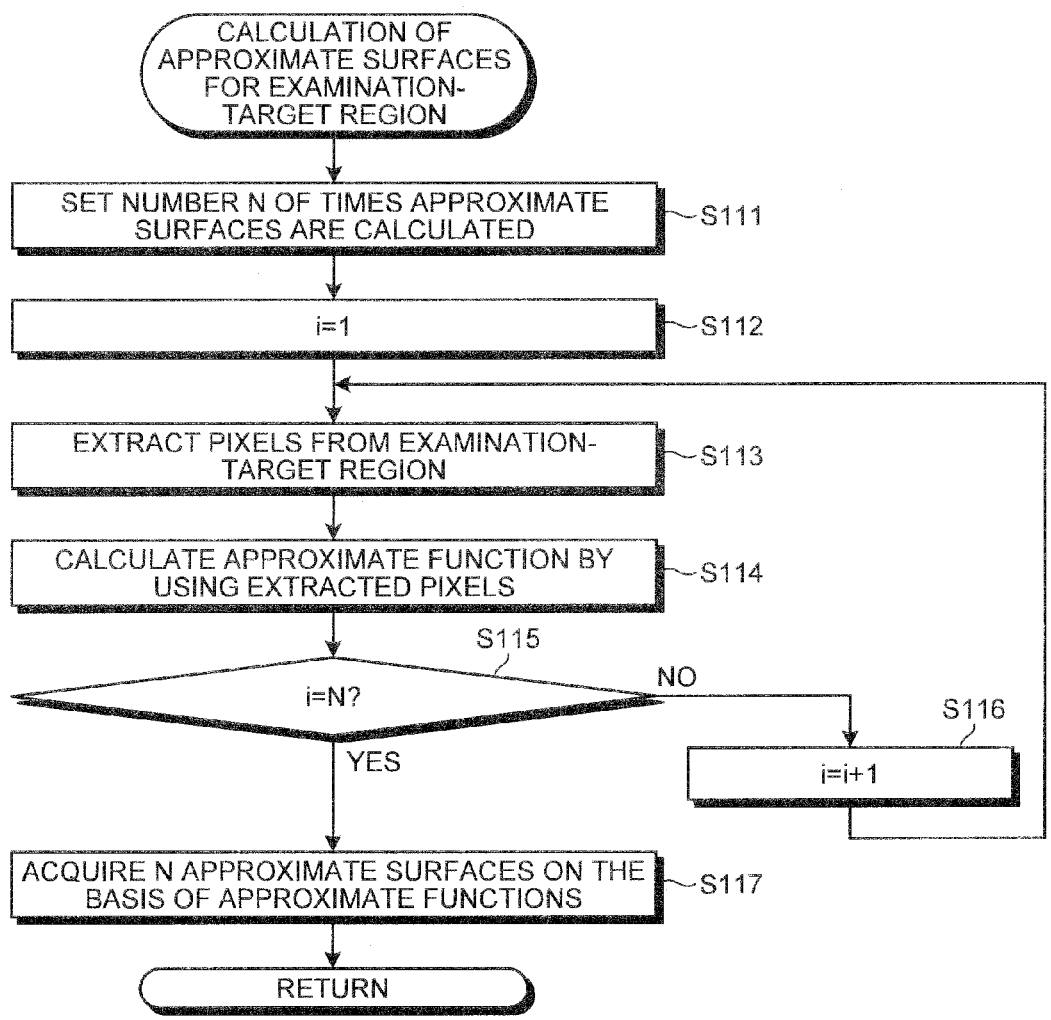
FIG. 10 is a flowchart that illustrates an operation of an approximate-surface calculator.

Next, a detailed explanation is given of the process for calculating multiple approximate surfaces (Step S102). FIG. 10 is a flowchart that illustrates an operation of the approximate-surface calculator 16.

Figure 7:
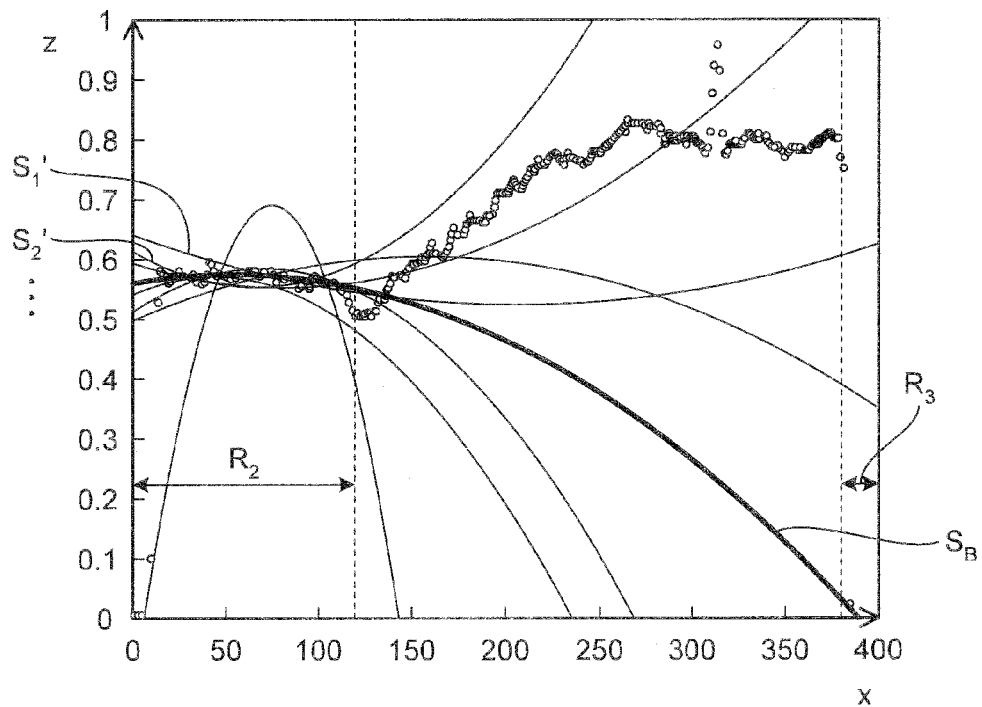
FIG. 7 is a graph that illustrates a process for selecting an approximate surface.

First, at Step S111, the number-of-calculations setting unit 161 sets the number N of times calculations of approximate surfaces are performed. A fixed value, which is set in advance, may be used as the number N each time. Alternatively, a pre-set value may be used only the first time and, afterwards, the number N of times calculations are performed may be decreased and set each time a new examination-target region is set at Step S106, which will be described later. This is because, as illustrated in FIG. 7, the newly set examination-target regions (the regions $R_2$, $R_3$) are smaller compared to a case where the examination-target region (the region $R_0$) is the entire image 100, as illustrated in FIG. 5, and it is easier to calculate a desirable approximate surface even if the calculations are performed a smaller number of times.

Then, at Step S112, the approximate-surface calculator 16 sets a counter i to 1, which indicates the number of times the process has been performed.

At Step S113, the pixel extracting unit 162 extracts multiple pixels from the examination-target region. These pixels are used for calculating an approximate function later. Therefore, the number of pixels to be extracted is greater than or equal to the number of undetermined values of an approximate function. For example, in the case of a quadratic function that contains two variables, the number of undetermined values (coefficients) to be calculated is 6; therefore, the number of pixels greater than or equal to 6 is extracted.

At Step S114, the approximate-function calculator 163 calculates an approximate function by using the coordinates (x, y) of an extracted pixel and its pixel value z. Specifically, the coordinates of the extracted pixels and the pixel values, i.e., $(x_1, y_1, z_1)$, $(x_2, y_2, z_2)$, ... are assigned to a desired function by the approximate-function calculator 163 so that a system of equations or an over-determined system of equations is generated. This system of equations or over-determined system of equations is solved so that the coefficients included in the function are estimated. The A value, G value, B value may be used without being changed as the pixel value z. Alternatively, the brightness, color difference, color phase, color saturation, luminosity, or the like, which is calculated from the R value, G value, and B value, may be used.

For example, if the quadratic function given by the following equation (1) is calculated, the coefficients (constants) a to f are the undetermined values to be obtained.

$$z = ax^2 + by^2 + cxy + dx + ey + f \quad (1)$$

In this case, the following equation (2) may be solved, which can be obtained by the least squares method.

$$\begin{bmatrix} a \\ b \\ c \\ d \\ e \\ f \end{bmatrix} = (A^t \times A)^{-1} \times A^t \times \begin{bmatrix} z_1 \\ z_2 \\ \vdots \\ z_n \end{bmatrix} \quad (2)$$

where $$A = \begin{bmatrix} x_1^2 & y_1^2 & x_1 y_1 & x_1 & y_1 & 1 \\ x_2^2 & y_2^2 & x_2 y_2 & x_2 & y_2 & 1 \\ \vdots & \vdots & \vdots & \vdots & \vdots & \vdots \\ x_n^2 & y_n^2 & x_n y_n & x_n & y_n & 1 \end{bmatrix}$$

At Step S115, the approximate-surface calculator 16 determines whether the counter i has reached the number N of times calculations are performed. If the counter i has not reached the number N of times calculations are performed (No at Step S115), the approximate-surface calculator 16 increments the counter i (Step S116), and the process returns to Step S113.

Conversely, if the counter i has reached the number N of times calculations are performed (Yes at Step S115), the approximate-surface calculator 16 assigns all the coordinates (x, y) in the examination-target region to the N approximate functions, which have been calculated during the processes performed N number of times, so as to calculate the approximate value z' corresponding to each set of coordinates (x, y). Thus, the N approximate surfaces $S_1, S_2, \ldots, S_N$ are calculated (Step S117).

Figure 11:
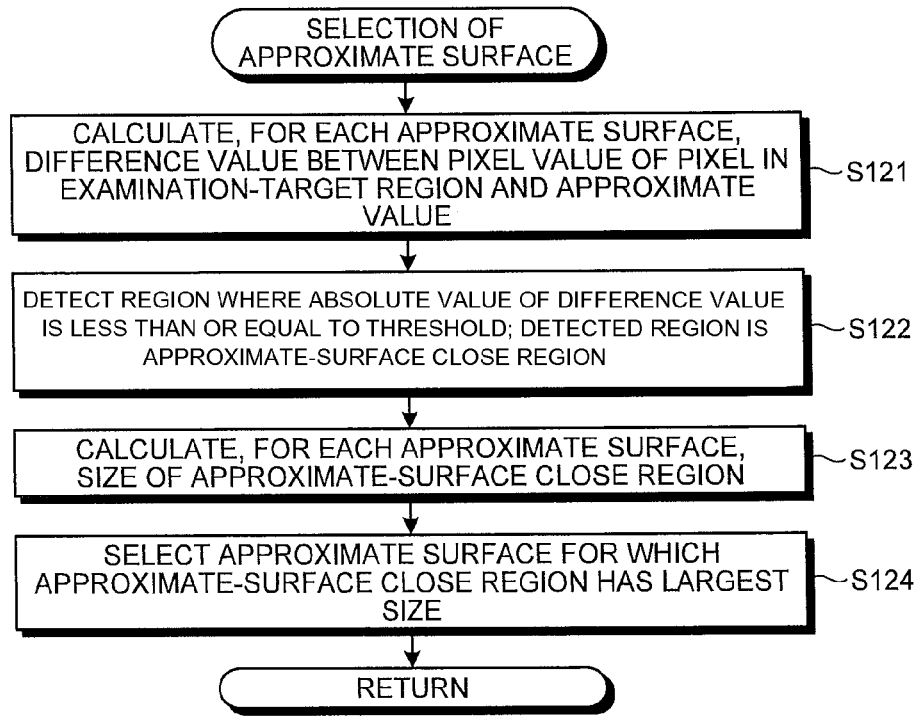
FIG. 11 is a flowchart that illustrates an operation of an approximate-surface selector.

Next, a detailed explanation is given of a process for selecting an approximate surface (Step S103). FIG. 11 is a flowchart that illustrates an operation of the approximate-surface selector 17.

First, at Step S121, the approximate-surface close-region detector 171 calculates, for each approximate surface, the difference value $\Delta z$ between the pixel value z of a pixel in the examination-target region and the approximate value z' at the coordinates of that pixel.

At Step S122, the approximate-surface close-region detector 171 detects, with respect to each of the approximate surfaces $S_1$ to $S_N$, a region where the absolute value of the difference value $\Delta z$ is less than or equal to a predetermined threshold. The detected region is an approximate-surface close region.

At Step S123, the approximate evaluation-value calculator 172 calculates, for each approximate surface, the size of the approximate-surface close region as an evaluation value for evaluating the degree of approximation of the approximate surface.

At Step S124, the approximate-surface selector 17 selects at least one approximate surface for which the approximate-surface close region has the largest size.

Figure 12:
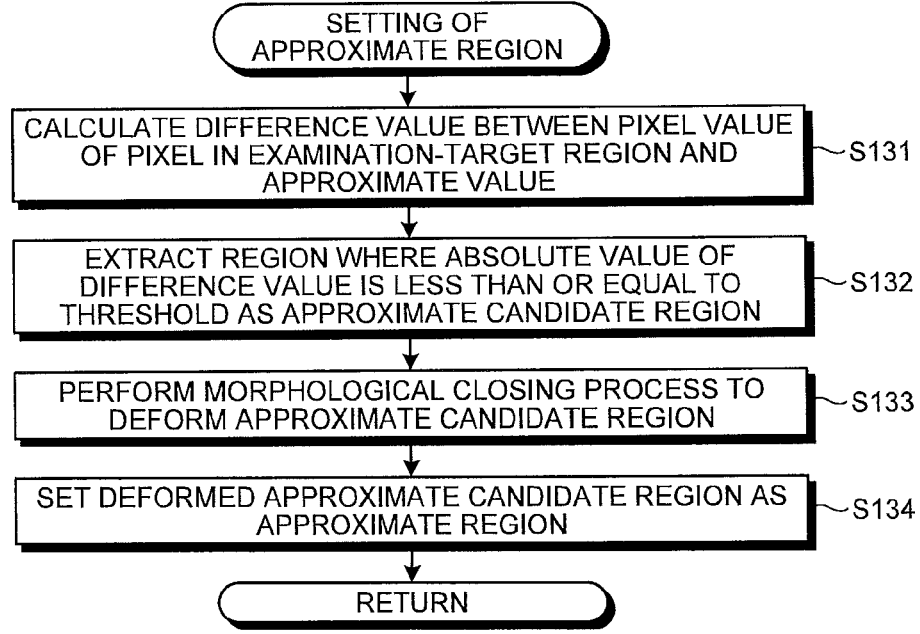
FIG. 12 is a flowchart that illustrates an operation of an approximate-region setting unit.

Next, a detailed explanation is given of a process for setting an approximate region (Step S104). FIG. 12 is a flowchart that illustrates an operation of the approximate-region setting unit 18.

At Step S131, the candidate-region detector 181 calculates, for each approximate surface selected by the approximate-surface selector 17, the difference value $\Delta z$ between the pixel value of a pixel in the examination-target region and the approximate value at the coordinates of that pixel.

At Step S132, the candidate-region detector 181 detects, as an approximate candidate region, a region where the absolute value of the difference value $\Delta z$ is less than or equal to a predetermined threshold.

Instead of performing Steps S131 and S132, the candidate-region detector 181 may extract the approximate-surface close region corresponding to the selected approximate surface from the approximate-surface close regions that have been detected during the detection (Step S122) of the approximate-surface close regions. In this case, the storage unit 14 may store information about the approximate-surface close region detected by the approximate-surface close-region detector 171, and the candidate-region detector 181 may acquire this information from the storage unit 14. Thus, it is possible to reduce the number of calculations performed by the calculator 15.

At Step S133, the candidate-region deforming unit 182 performs a morphological closing operation so as to deform the approximate candidate region. The morphological closing operation is a process in which a basic graphic, called a structuring element, is brought into contact with the outer circumference of the approximate candidate region and is moved along the approximate candidate region, whereby the locus along which the outer circumference of the structuring element passes is obtained (Hidefumi, Kobatake, "Morphology", CORONA PUBLISHING CO., LTD.).

The approximate surface selected by the approximate-surface selector 17 is a surface that approximates changes in the pixel values of a partial region in the examination target region, and a large part of the partial region is included in the approximate candidate region. However, because the abnormal region located inside the partial region or located at an adjacent area shows a pixel value's change that is different from that of the partial region, there is a high possibility that the abnormal region is not included in the approximate candidate region in which the abnormal region is supposed to be included. Therefore, in order to detect a change in the pixel value of the abnormal region on the basis of the difference from changes in the pixel values of surrounding pixels, it is necessary to obtain a surface that approximates changes in the pixel values of the surrounding pixels at the position of the pixel of the abnormal region.

The candidate-region deforming unit 182 performs a closing process on the approximate candidate region and deforms the approximate candidate region so as to cover a hole (non approximate candidate region) inside the approximate candidate region or so as to cover a local discontinuity at the boundary of approximate candidate regions.

At Step S134, the approximate-region setting unit 18 sets the deformed approximate candidate region as an approximate region. Thus, if there is an abnormal region inside the approximate candidate region or in an adjacent area, the region can be included in the approximate region of the surface on which the pixel value changes in a similar pattern to those of the surrounding pixels, i.e., in the approximate region of the approximate surface, which has been used for calculating the approximate candidate region. As a result, an abnormal region can be detected on the basis of the difference between the pixel value of a pixel in the approximate region and the approximate value at the coordinates of that pixel.

As described above, according to the first embodiment, an approximate surface that approximates the pixel value of a pixel in the examination-target region is obtained, an approximate region that is approximated by the approximate surface is obtained, and the difference value between the pixel value of a pixel in the approximate region and the value at the corresponding coordinates on the approximate surface is calculated, whereby it is possible to perform high-accuracy detection of an abnormal region that shows a pixel value's change that is different from those in the surroundings.

Although an explanation is given above of a process performed on one type of wavelength component (e.g., G component), the first embodiment can be used for multiple wavelength components. Specifically, first, the processes of calculation of approximate surfaces (Step S102), selection (Step S103), and setting of an approximate region (Step S104) are performed on the R component. Then, the processes of calculation of approximate surfaces (Step S102) and selection (Step S103) are performed on each of the G and B components in the approximate region selected on the basis of the R component. Furthermore, the difference between the pixel value and the approximate value of each pixel is calculated for each wavelength component, and an abnormal region is detected for each wavelength component on the basis of the above difference (Step S107).

Because the R component is a wavelength component that is located away from the absorption band of blood and is a component that has the longest wavelength among the three components of a pixel value, the R component is hardly affected by the absorption or scattering in a living body and indicates a pixel value that most represents the structure (the shape of mucous membrane, or the like) of living tissue, which is the target to be captured. Therefore, the approximate surface obtained on the basis of the R component represents the shape of mucous membrane, or the like. On the other hand, the G and B components are easily affected by blood's absorption of illumination light at an abnormal region, such as a bleeding site. Therefore, as described above, an approximate surface is calculated on the basis of the G and B components in the approximate region that has been set on the basis of the R component, whereby it is possible to desirably detect a lesion region (bleeding site, or the like) in the living body that absorbs a large amount of light and shows a color change in the region that represents the shape of mucous membrane, or the like.

Modified Example 1-1

Figure 13:
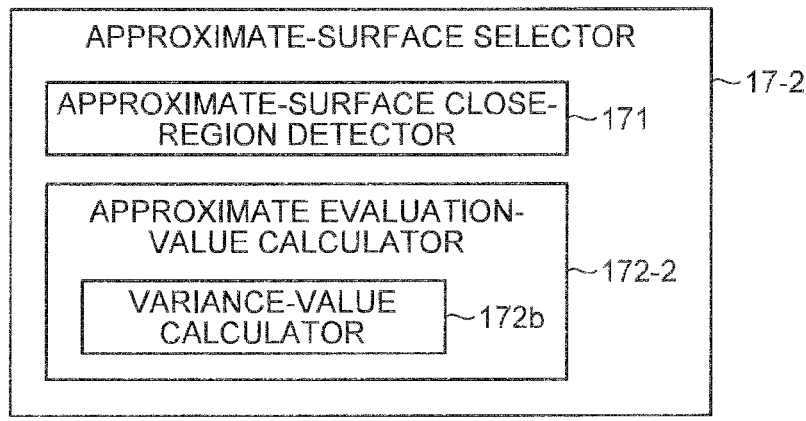
FIG. 13 is a block diagram that illustrates the configuration of an approximate-surface selector according to a modified example 1-1.

Next, an explanation is given of a modified example 1-1 of the first embodiment with reference to FIG. 13.

An image processing apparatus according to the modified example 1-1 includes, instead of the approximate-surface selector 17 illustrated in FIG. 1, an approximate-surface selector 17-2 that includes the approximate-surface close-region detector 171 and an approximate evaluation-value calculator 172-2. The approximate evaluation-value calculator 172-2 includes a variance-value calculator 172b that calculates the variance of the difference value $\Delta z$ between the pixel value z of a pixel in the examination-target region and the approximate value z' at the coordinates of that pixel. The approximate evaluation-value calculator 172-2 calculates the variance as an evaluation value for evaluating the degree of approximation of an approximate surface.

Figure 14:
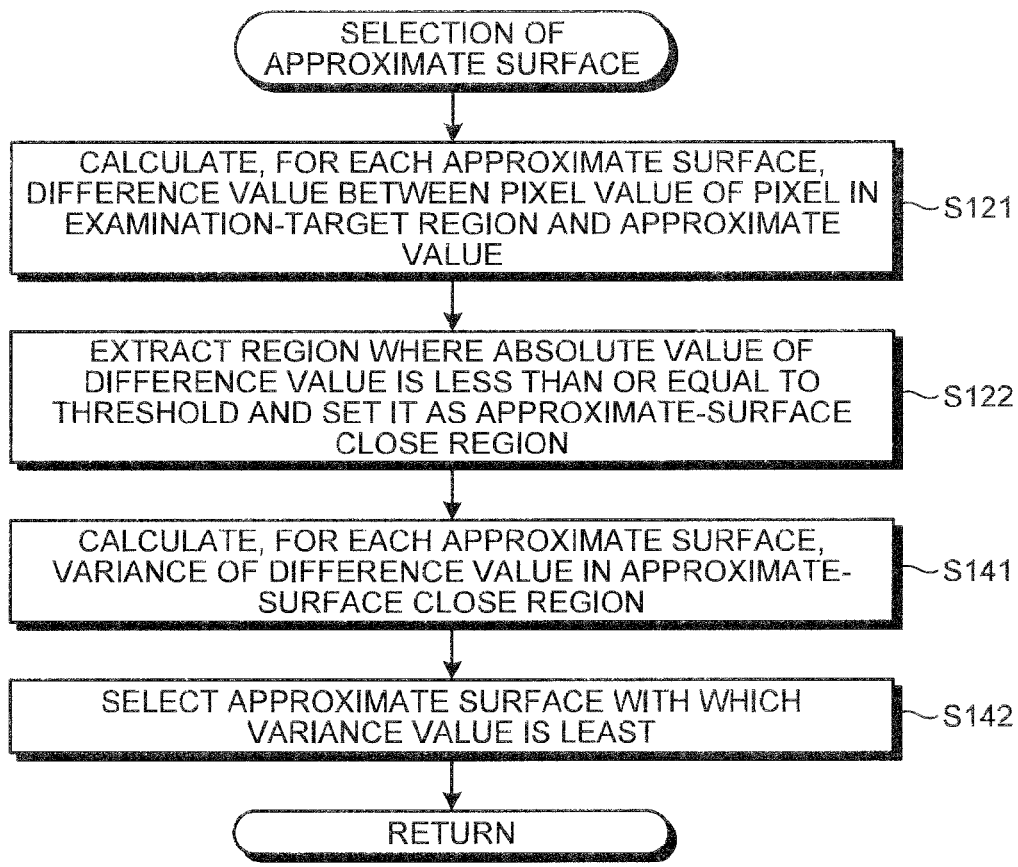
FIG. 14 is a flowchart that illustrates an operation of the approximate-surface selector according to the modified example 1-1.

FIG. 14 is a flowchart that illustrates an operation of the approximate-surface selector 17-2 according to the modified example 1-1. The operations performed at Steps S121 and S122 are the same as those described for the first embodiment.

At Step S141, which follows after Step S122, the approximate evaluation-value calculator 172-2 calculates, for each approximate surface, the variance of the difference value Δz in the approximate-surface close region.

At Step S142, the approximate-surface selector 17-2 selects at least one approximate surface with which the variance of the difference value Δz is the least.

According to the modified example 1-1, it is possible to select, from the approximate surfaces $S_1$ to $S_N$, an approximate surface that is more suitable for changes in the pixel values in part of the examination-target region. Therefore, during an abnormal-region detection process that will be performed later, it is possible to perform high-accuracy detection of an abnormal region that shows a pixel value's change that is different from those in the surroundings.

Modified Example 1-2

Figure 15:
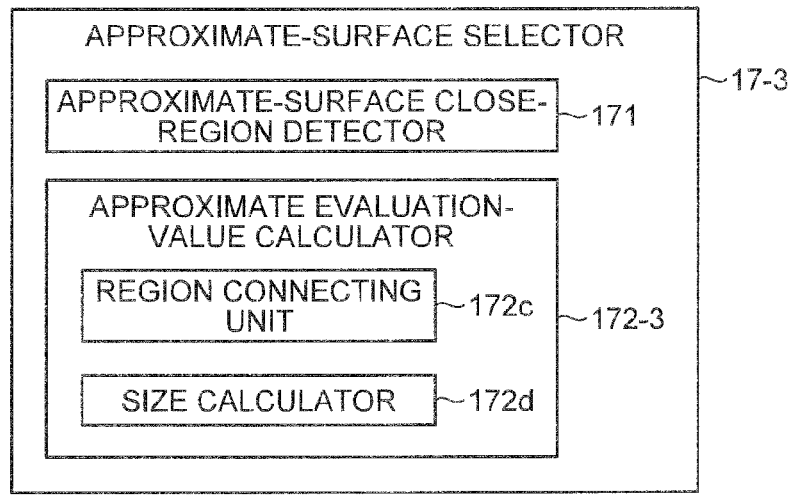
FIG. 15 is a block diagram that illustrates the configuration of an approximate-surface selector according to a modified example 1-2.

Next, an explanation is given of a modified example 1-2 of the first embodiment with reference to FIG. 15.

An image processing apparatus according to the modified example 1-2 includes an approximate-surface selector 17-3 instead of the approximate-surface selector 17 illustrated in FIG. 1. The approximate-surface selector 17-3 includes the approximate-surface close-region detector 171 and an approximate evaluation-value calculator 172-3 that calculates an evaluation value for evaluating the degree of approximation of an approximate surface in a connected approximate-surface close region. The approximate-surface selector 17-3 selects at least one approximate surface from multiple approximate surfaces by using the evaluation value.

The approximate evaluation-value calculator 172-3 includes a region connecting unit 172c that performs a labeling process (see pages 181 to 182, Digital Image Processing, CG-ARTS Society) so as to connect adjacent pixels in the approximate-surface close region and so as to obtain one connected region; and includes a size calculator 172d that calculates the size of each connected region.

Figure 16:
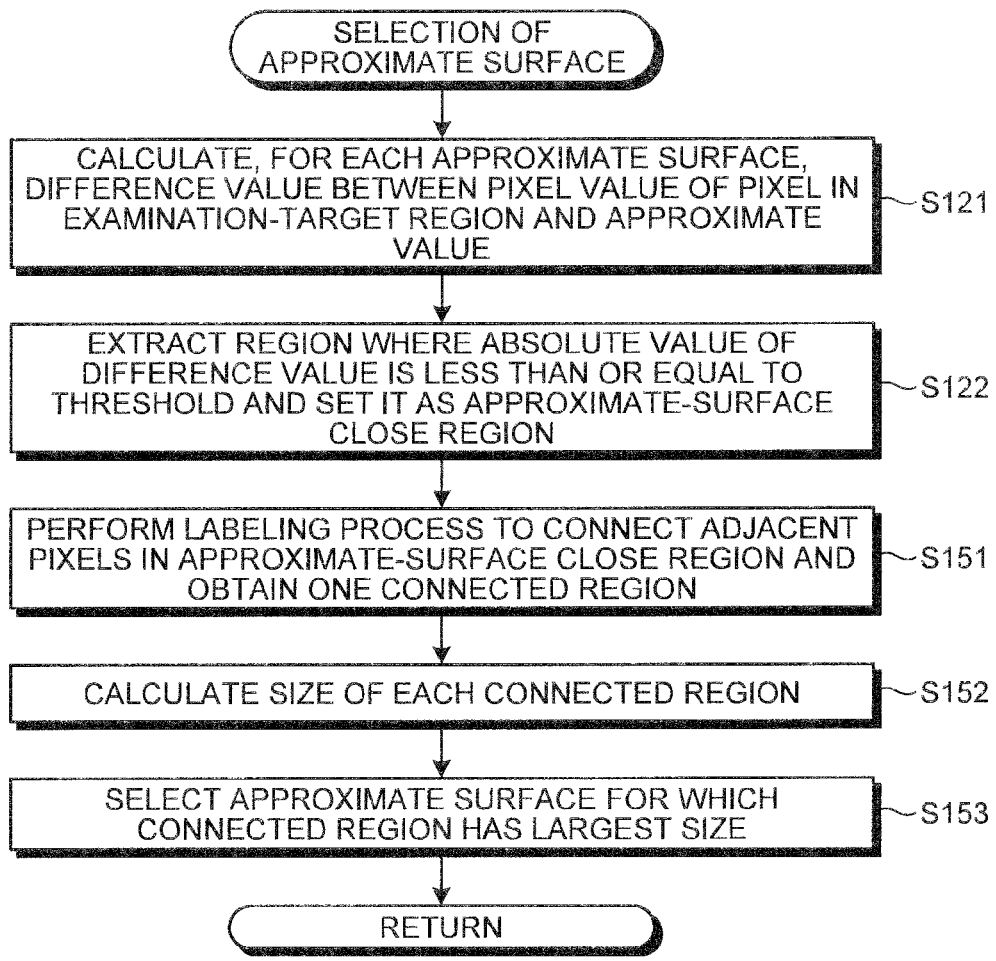
FIG. 16 is a flowchart that illustrates an operation of the approximate-surface selector according to the modified example 1-2.

FIG. 16 is a flowchart that illustrates an operation of the approximate-surface selector 17-3. The operations performed at Steps S121 and S122 are the same as those explained for the first embodiment.

At Step S151, which follows after Step S122, the region connecting unit 172c performs a labeling process on the image 100 so as to connect adjacent pixels in the approximate-surface close region and so as to obtain one connected region.

At Step S152, the size calculator 172d calculates the size of each connected region.

At Step S153, the approximate-surface selector 17-3 selects at least one approximate surface for which the connected region has the largest size.

According to the modified example 1-2, it is possible to select an approximate surface while reducing the effect of a noise region that occurs because the pixel value of a pixel in the examination-target region locally matches the approximate value at the coordinates of that pixel. Thus, during an abnormal-region detection process that will be performed later, it is possible to perform high-accuracy detection of an abnormal region that shows a pixel value's change that is different from those in the surroundings.

Modified Example 1-3

Figure 17:
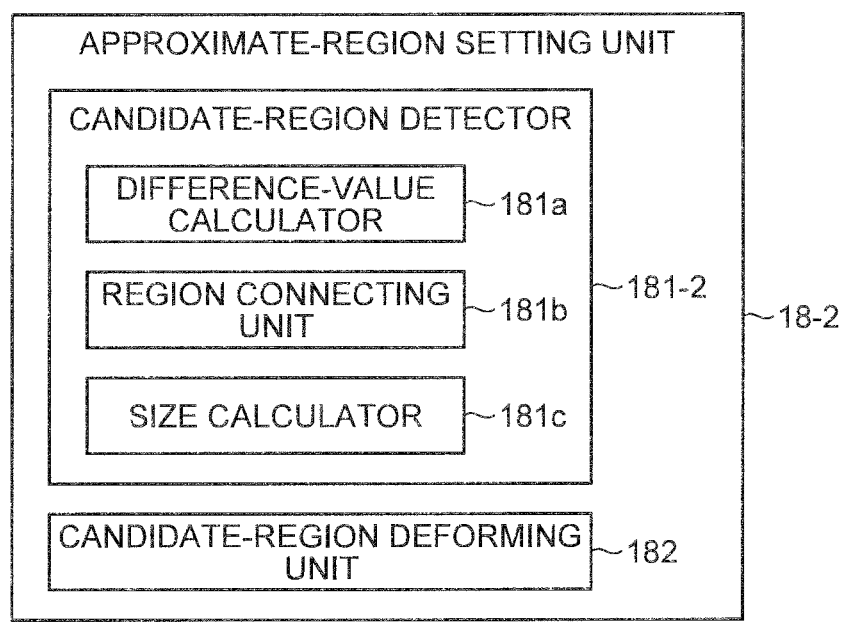
FIG. 17 is a block diagram that illustrates the configuration of an approximate-region setting unit according to a modified example 1-3.

Next, an explanation is given of a modified example 1-3 of the first embodiment with reference to FIG. 17.

An image processing apparatus according to the modified example 1-3 includes an approximate-region setting unit 18-2 instead of the approximate-region setting unit 18 illustrated in FIG. 1. The approximate-region setting unit 18-2 includes a candidate-region detector 181-2 that detects an approximate candidate region; and the candidate-region deforming unit 182 that deforms the detected approximate candidate region. The approximate-region setting unit 18-2 sets the deformed approximate candidate region as an approximate region.

The candidate-region detector 181-2 includes, in addition to the difference-value calculator 181a, a region connecting unit 181b that performs a labeling process so as to connect adjacent pixels in the approximate candidate region and so as to obtain one connected region; and includes a size calculator 181c that calculates the size of each connected region. The candidate-region detector 181-2 sets a candidate for an approximate region on the basis of the size of the connected region.

Figure 18:
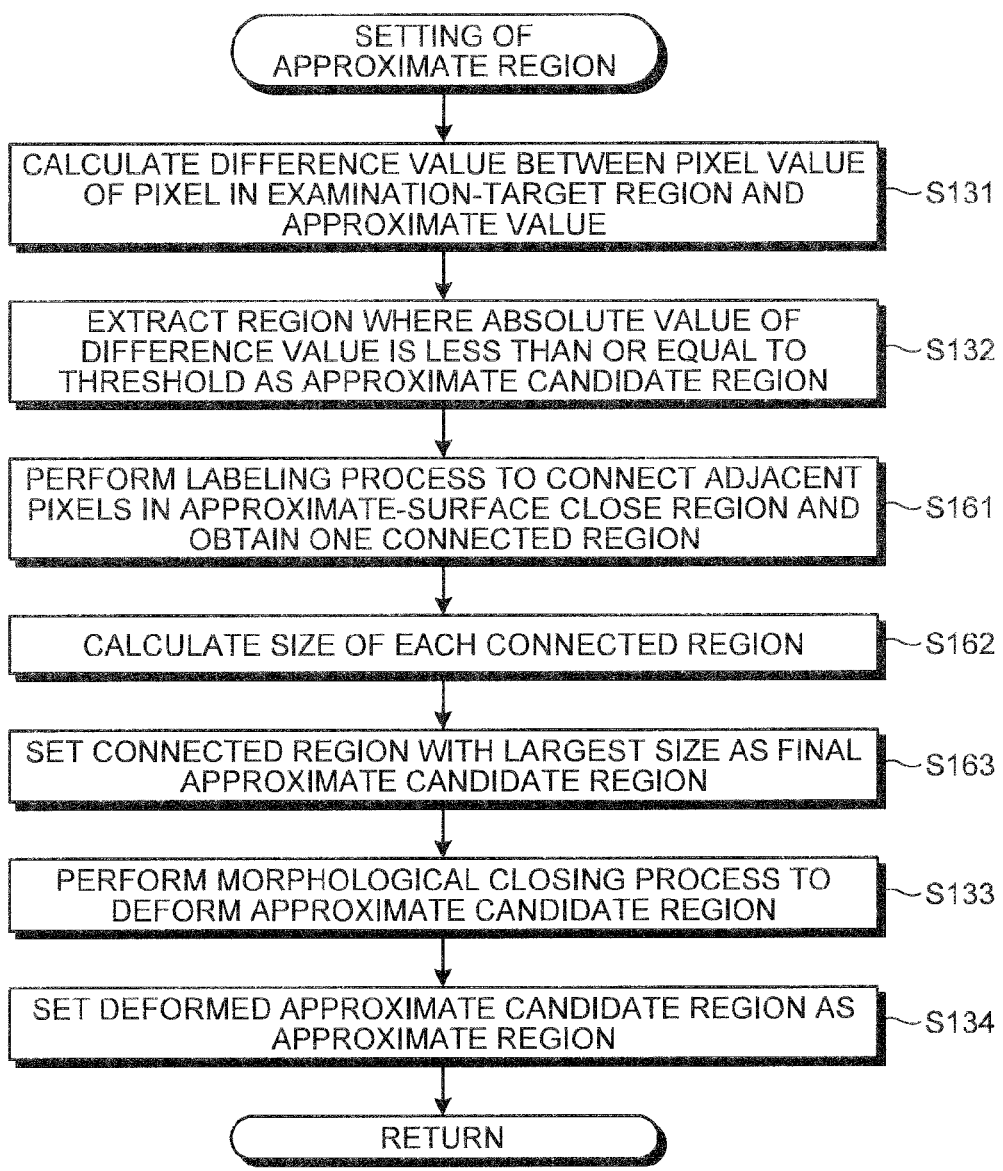
FIG. 18 is a flowchart, that illustrates an operation of the approximate-region setting unit according to the modified example 1-3.

FIG. 18 is a flowchart that illustrates an operation of the approximate-region setting unit 18-2. The operations performed at Steps S131, S132, S133, and S134 are the same as those explained for the first embodiment.

At Step S161, which follows after Step S132, the region connecting unit 181b performs a labeling process so as to connect adjacent pixels in the approximate candidate region and so as to obtain one connected region.

At Step S162, the size calculator 181c calculates the size of each connected region.

At Step S163, the candidate-region detector 181-2 selects the connected region that has the largest size as the final approximate candidate region.

According to the modified example 1-3, it is possible to set an approximate region while reducing the effect of a noise region that occurs because the pixel value of a pixel in the examination-target region locally matches the approximate value at the coordinates of the pixel. Thus, during an abnormal-region detection process that will be performed later, it is possible to perform high-accuracy detection of an abnormal region that shows a pixel value's change that is different from those in the surroundings.

Modified Example 1-4

Figure 19:
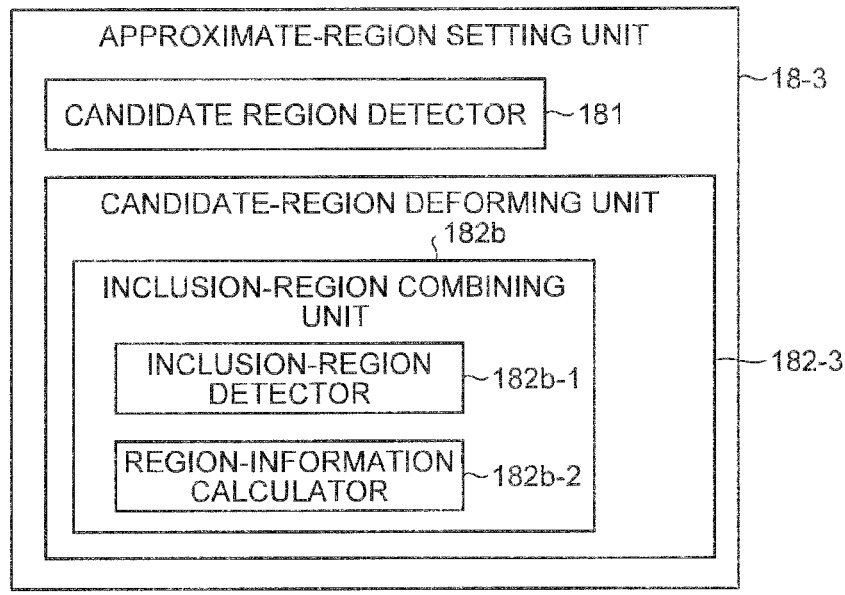
FIG. 19 is a block diagram that illustrates the configuration of an approximate-region setting unit according to a modified example 1-4.

Next, an explanation is given of a modified example 1-4 of the first embodiment with reference to FIG. 19.

An image processing apparatus according to the modified example 1-4 includes an approximate-region setting unit 18-3 instead of the approximate-region setting unit 18 illustrated in FIG. 1. The approximate-region setting unit 18-3 includes the candidate-region detector 181 that detects an approximate candidate region; and a candidate-region deforming unit 182-3 that combines an inclusion region, which is included in the detected approximate candidate region, with the approximate candidate region so as to deform the approximate candidate region. The approximate-region setting unit 18-3 sets the deformed candidate region as an approximate region.

The candidate-region deforming unit 182-3 includes an inclusion-region combining unit 182b that combines an inclusion region, which is included in the candidate region, with the candidate region. The inclusion-region combining unit 182b includes an inclusion-region detector 182b-1 that detects, as an inclusion region, a region that includes pixels other than those in the approximate candidate region and that is not in contact with the edge of the image 100; and includes a region-information calculator 182b-2 that calculates information (e.g., the size) about the inclusion region. The inclusion-region combining unit 182b combines the approximate candidate region with the inclusion region that has a size less than or equal to a predetermined threshold.

Figure 20:
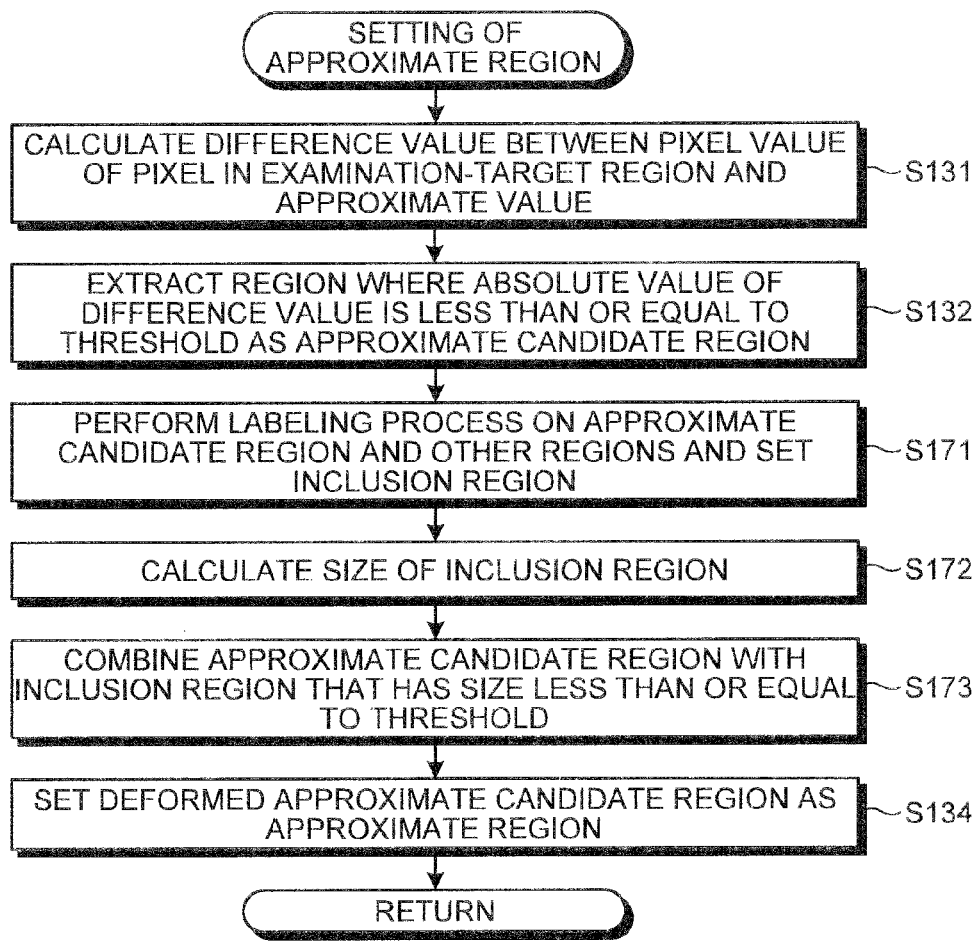
FIG. 20 is a flowchart that illustrates an operation of the approximate-region setting unit according to the modified example 1-4.

FIG. 20 is a flowchart that illustrates an operation of the approximate-region setting unit 18-3. The operations performed at Steps S131 and S132 are the same as those in the first embodiment.

At Step S171, which follows after Step S132, the inclusion-region detector 182b-1 performs a labeling process on the extracted approximate candidate region and the other regions and detects, as an inclusion region, a region that includes pixels other than those in the approximate candidate region and that is not in contact with the edge of the image 100.

At Step S172, the region-information calculator 182b-2 calculates the size of the inclusion region, which is information about the inclusion region.

At Step S173, the candidate-region deforming unit 182-3 combines the approximate candidate region with the inclusion region, which has a size less than or equal to a predetermined threshold, so as to deform the approximate candidate region.

The operations performed after Step S134 are the same as those in the first embodiment.

According to the modified example 1-4, if the inclusion region that has a size less than or equal to a predetermined threshold is an abnormal region, it is possible to obtain an approximate surface, which is suitable for changes in the pixel values in the surroundings, at the position of the pixel of the abnormal region. Thus, during an abnormal-region detection process that will be performed later, it is possible to perform high-accuracy detection of an abnormal region that shows a pixel value's change that is different from those in the surroundings.

Second Embodiment

Figure 21:
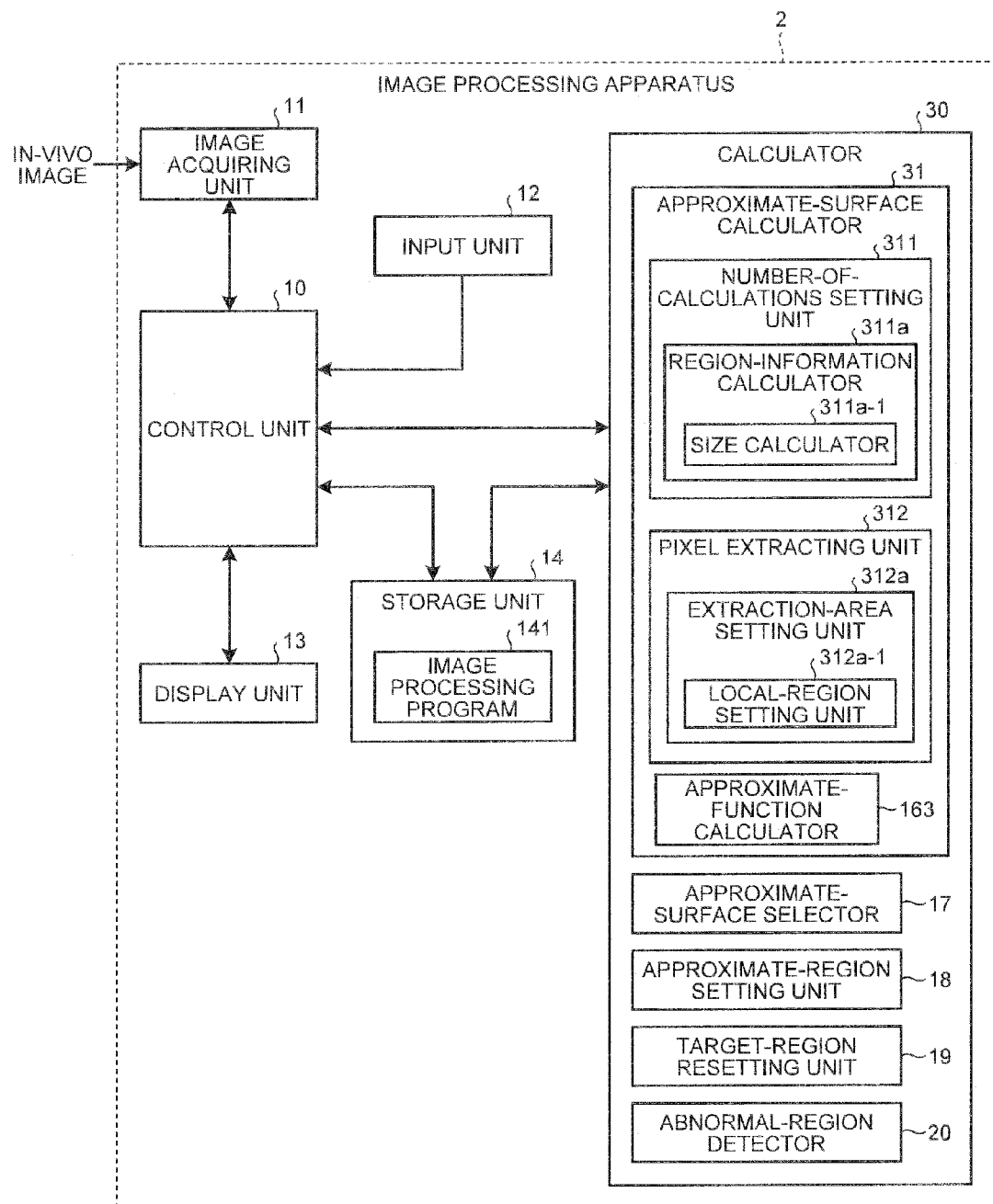
FIG. 21 is a block diagram that illustrates the configuration of an image processing apparatus according to a second embodiment.

Next, an explanation is given of a second embodiment of the present invention. FIG. 21 is a block diagram that illustrates the configuration of an image processing apparatus according to the second embodiment. An image processing apparatus 2 illustrated in FIG. 21 includes a calculator 30 that includes an approximate-surface calculator 31 instead of the approximate-surface calculator 16 illustrated in FIG. 1. The other configurations are the same as those explained for the first embodiment.

The approximate-surface calculator 31 includes a number-of-calculations setting unit 311 that sets the number of times calculations of approximate surfaces are performed; a pixel extracting unit 312 that extracts, from the examination-target region, multiple pixels that are to be used for the calculation of an approximate function; and the approximate-function calculator 163. The operation of the approximate-function calculator 163 is the same as that explained for the first embodiment.

The number-of-calculations setting unit 311 includes a region-information calculator 311a that calculates information (region information) to be used for setting the number of times calculations of approximate surfaces are performed. The region-information calculator 311a includes a size calculator 311a-1 that calculates the size of the examination-target region.

If the size of the examination-target region is large, there is a high possibility that changes in the pixel values in the examination-target region vary widely compared to the examination-target region that has a small size. Therefore, if the size of the examination-target region is large, a greater number of approximate surfaces are calculated so that it highly possible to calculate an approximate surface that is suitable for changes in the pixel values in part of the examination-target region. According to the second embodiment, the number of times calculations of approximate surfaces are performed is set according to the size of the examination-target region.

The pixel extracting unit 312 includes an extraction-area setting unit 312a that sets a pixel extraction area to be used for calculating an approximate surface. The pixel extracting unit 312 extracts a pixel from the set extraction area. The extraction-area setting unit 312a includes a local-region setting unit 312a-1. The extraction-area setting unit 312a sets the local region set by the local-region setting unit 312a-1 as the pixel extraction area.

If changes in the pixel values in the examination-target region vary widely, pixels used for calculating an approximate surface are extracted from a region that is limited to some extent so that it is highly possible to calculate an approximate surface that is suitable for changes in the pixel values in part of the examination-target region. Therefore, according to the second embodiment, in order to extract pixels from a limited local region, multiple regions with a predetermined size are set within the examination-target region.

Next, an explanation is given of an operation of the image processing apparatus 2. The overall operation of the image processing apparatus 2 is the same as that illustrated in FIG. 2; however, the detailed operation performed during the process (Step S102) performed on the examination-target region to calculate multiple approximate surfaces is different from that in the first embodiment.

Figure 22:
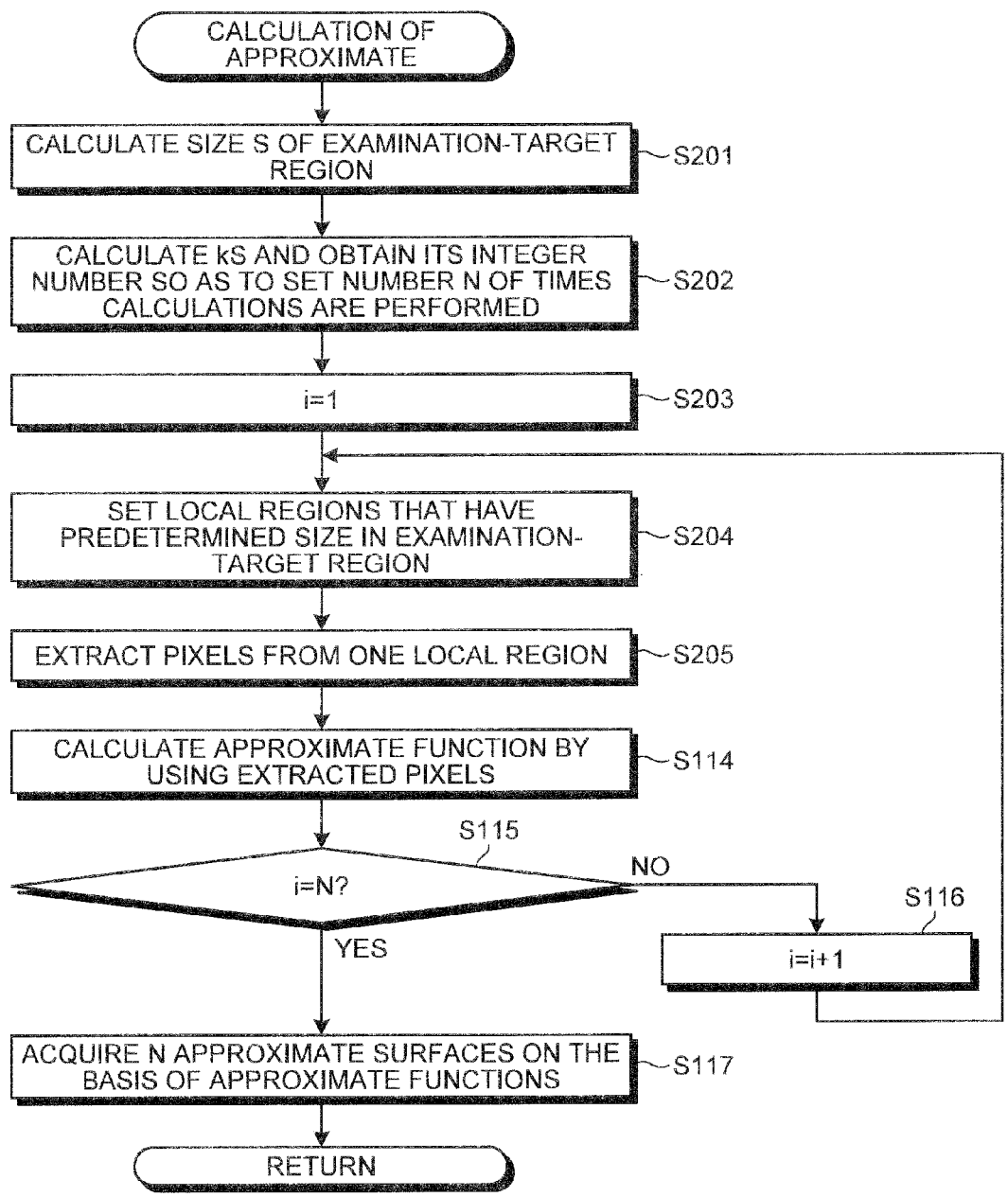
FIG. 22 is a flowchart that illustrates an operation of an approximate-surface calculator illustrated in FIG. 21.

FIG. 22 is a flowchart that illustrates an operation of the approximate-surface calculator 31.

First, at Step S201, the region-information calculator 311a calculates the size S, which is information about the examination-target region.

Then, at Step S202, the number-of-calculations setting unit 311 calculates kS (k is a positive constant) and rounds off kS, or the like, so as to obtain its integer number. The obtained number is set as the number N of times calculations of approximate surfaces are performed for the examination-target region.

Then, at Step S203, the approximate-surface calculator 31 sets the counter i to 1.

At Step S204, the extraction-area setting unit 312a sets multiple local regions that each have a predetermined radius in the examination-target region.

At Step S205, the pixel extracting unit 312 extracts multiple pixels from one local region.

The subsequent operations performed at Steps S114 to S117 are the same as those in the first embodiment.

As described above, according to the second embodiment, as the size of the examination-target region becomes larger, the number of times calculations of approximate surfaces are performed is set to be greater; therefore, it is easier to calculate an approximate surface that is suitable for changes in the pixel values in part of the examination-target region. Furthermore, according to the second embodiment, because an approximate surface is calculated using the pixels that are extracted from the limited local region within the examination-target region, it is easier to calculate an approximate surface that is suitable for changes in the pixel values in part of the examination-target region. Therefore, during an abnormal-region detection process that will be performed later, it is possible to perform high-accuracy detection of an abnormal region that shows a pixel value's change that is different from those in the surroundings.

Modified Example 2-1

Figure 23:
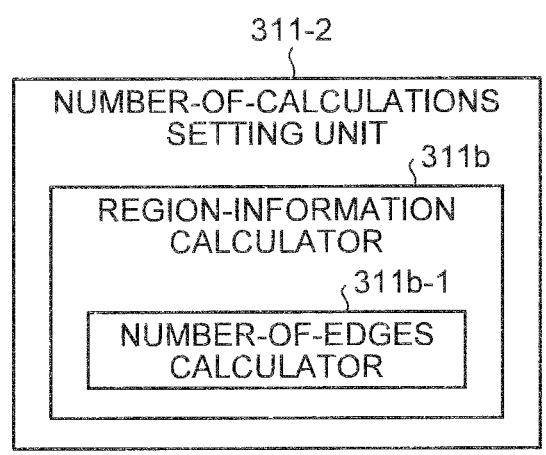
FIG. 23 is a block diagram that illustrates the configuration of a number-of-calculations setting unit according to a modified example 2-1.

Next, an explanation is given of a modified example 2-1 of the second embodiment with reference to FIG. 23.

An image processing apparatus according to the modified example 2-1 includes a number-of-calculations setting unit 311-2 that includes a region-information calculator 311b instead of the number-of-calculations setting unit 311 illustrated in FIG. 21. The region-information calculator 311b includes a number-of-edges calculator 311b-1 and calculates the number of edges as the region information to be used for setting the number of times calculations of approximate surfaces are performed.

If there are a large number of edges in the examination-target region, there is a high possibility that changes in the pixel values in the examination-target region vary widely. Therefore, if there are a large number of edges, a greater number of approximate surfaces are calculated so that it is highly possible to calculate an approximate surface that is suitable for changes in the pixel values in part of the examination-target region. According to the modified example 2-1, the number of times calculations of approximate surfaces are performed is set according to the number of edges in the examination-target region.

Specifically, the number-of-calculations setting unit 311-2 performs the following calculation. First, the region-information calculator 311b acquires the edge strength of the image 100 by using a known differential filter (see page 114, Digital Image Processing, CG-ARTS Society) and calculates the average value V of the edge strength in the examination-target region. Next, the number-of-calculations setting unit 311-2 calculates k'V (k' is a positive constant) by using the average value V of the edge strength and then rounds off k'V, or the like, so as to obtain an integer number. The obtained number is set as the number N of times calculations of approximate surfaces are performed for the examination-target region.

According to the modified example 2-1, because the number of times calculations of approximate surfaces are performed is set in proportion to the average value of the edge strength in the examination-target region, it is easier to calculate an approximate surface that is suitable for changes in the pixel values in part of the examination-target region. Therefore, during an abnormal-region detection process that will be performed later, it is possible to perform high-accuracy detection of an abnormal region that shows a pixel value's change that is different from those in the surroundings.

Modified Example 2-2

Figure 24:
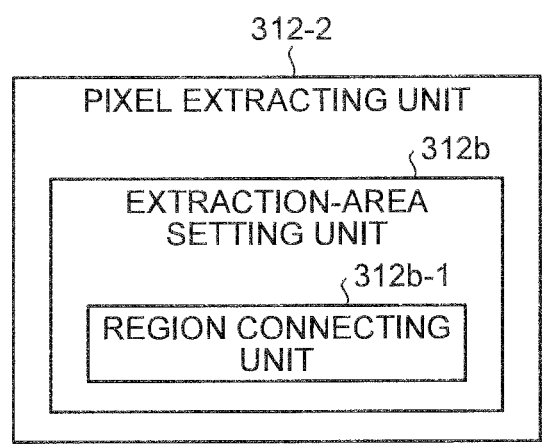
FIG. 24 is a block diagram that illustrates the configuration of a pixel extracting unit according to a modified example 2-2.

Next, an explanation is given of a modified example 2-2 of the second embodiment with reference to FIG. 24.

An image processing apparatus according to the modified example 2-2 includes a pixel extracting unit 312-2 that includes an extraction-area setting unit 312b instead of the pixel extracting unit 312 illustrated in FIG. 21. The extraction-area setting unit 312b includes a region connecting unit 312b-1. The extraction-area setting unit 312b sets the region connected by the region connecting unit 312b-1 as the pixel extraction area.

Figure 8:
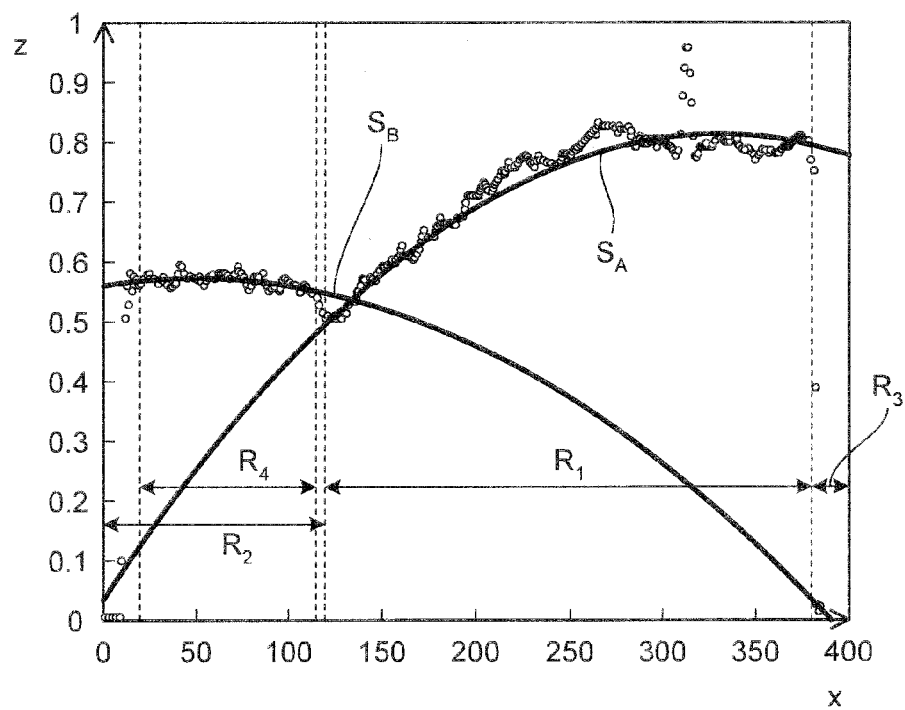
FIG. 8 is a graph that illustrates a process for setting an approximate region.

For example, as illustrated in FIG. 8, as a process for setting an approximate surface or approximate region proceeds, the number of subdivided examination-target regions is increased. According to the modified example 2-2, a labeling process is performed on the image 100 so as to connect adjacent pixels in the examination-target region and obtain a connected region, and the connected region obtained by the above operation is set as the extraction area of pixels that are to be used for calculating approximate surfaces.

Specifically, the pixel extracting unit 312-2 performs the following calculation. First, the extraction-area setting unit 312b performs a labeling process on the image 100 and sets a connected region that is obtained by connecting adjacent pixels in the examination-target region. The pixel extracting unit 312-2 extracts multiple pixels from the same connected region.

According to the modified example 2-2, because the pixels to be used for calculating an approximate surface are extracted from the connected examination-target region, it is easier to calculate an approximate surface that is suitable for changes in the pixel values in part of the examination-target region. Therefore, during an abnormal-region detection process that will be performed later, it is possible to perform high-accuracy detection of an abnormal region that shows a pixel value's change that is different from those in the surroundings.

Third Embodiment

Figure 25:
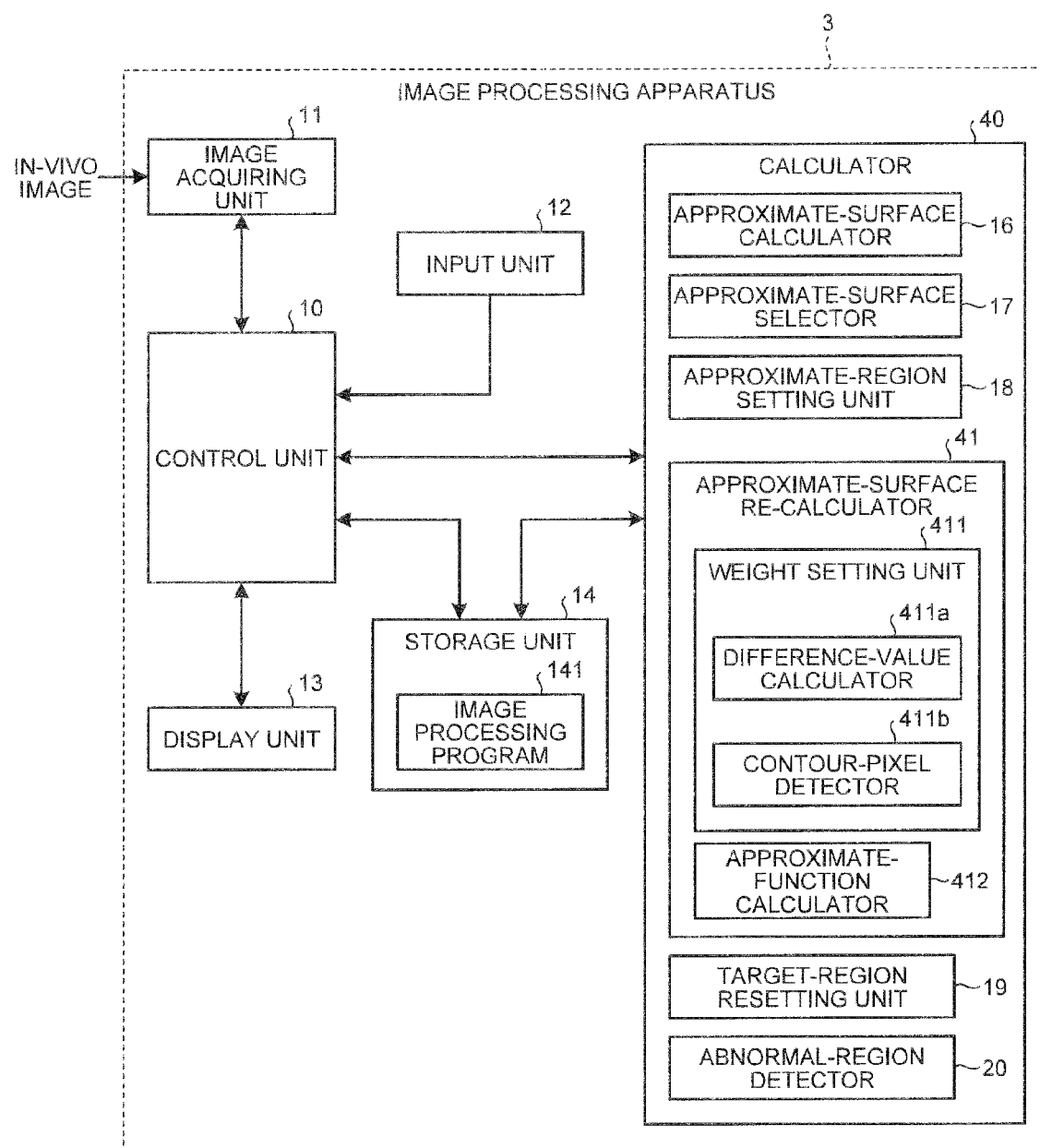
FIG. 25 is a block diagram that illustrates the configuration of an image processing apparatus according to a third embodiment.

Next, an explanation is given of a third embodiment. FIG. 25 is a block diagram that illustrates the configuration of an image processing apparatus according to the third embodiment. An image processing apparatus 3 illustrated in FIG. 25 includes, in addition to the approximate-surface calculator 16, the approximate-surface selector 17, the approximate-region setting unit 18, the target-region resetting unit 19, and the abnormal-region detector 20 illustrated in FIG. 1, a calculator 40 that includes an approximate-surface re-calculator 41. With respect to the approximate region set for an approximate surface, the approximate-surface re-calculator 41 recalculates an approximate surface that has a higher degree of approximation.

Figure 26A:
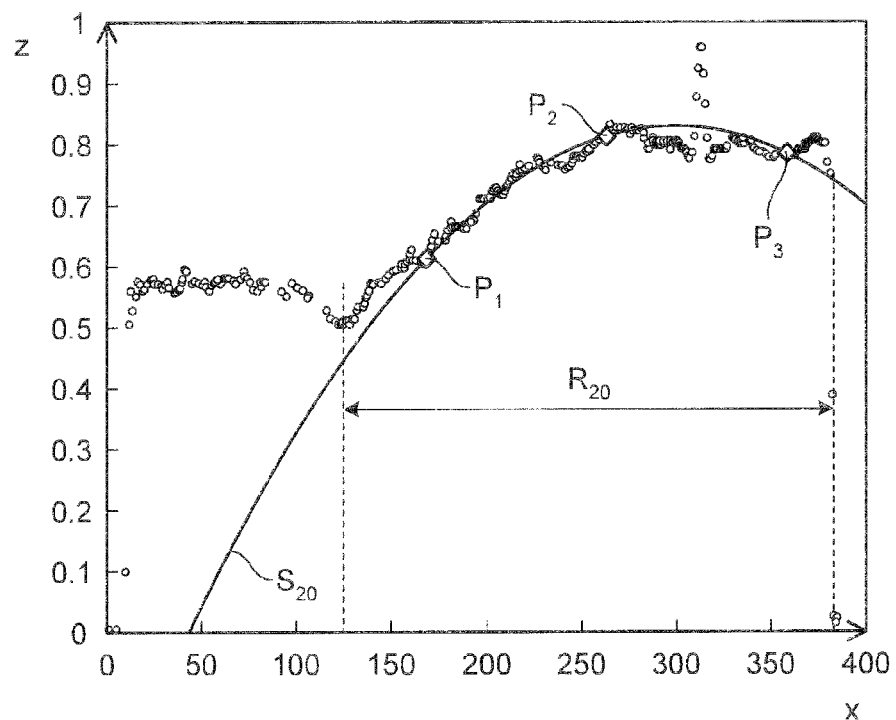
FIGS. 26A and 26B are graphs that illustrate image processing according to the third embodiment.
Figure 26B:
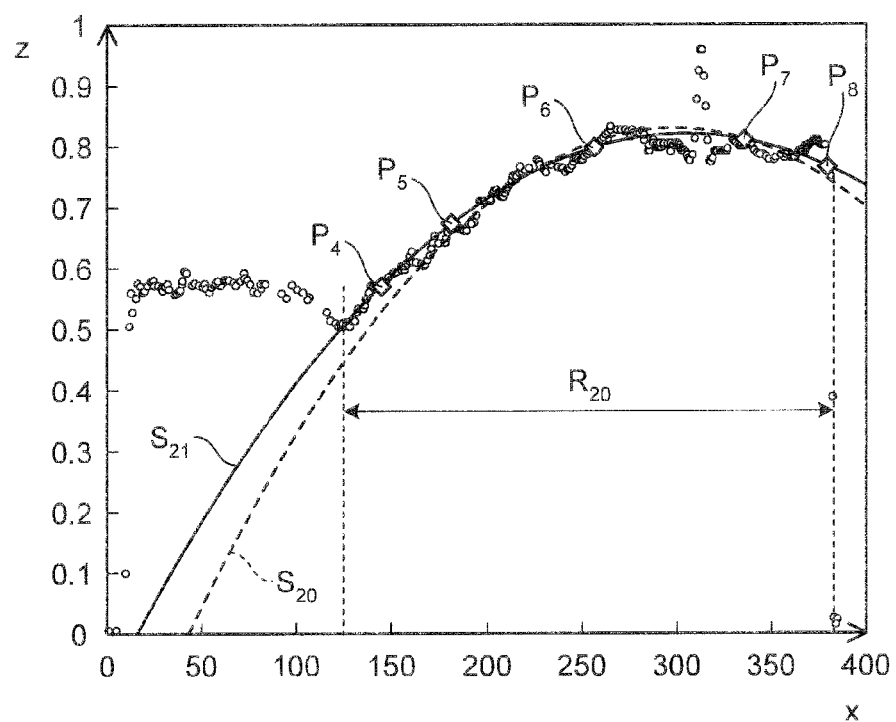

As illustrated in FIG. 26A, the approximate surface $S_{20}$, by which the approximate region $R_{20}$ is set, is calculated using arbitrary pixels (e.g., the pixels $P_1$, $P_2$, $P_3$) that are extracted from the examination-target region. Therefore, that approximate surface is not necessarily the approximate surface that best suits the approximate region $R_{20}$. According to the third embodiment, as illustrated in FIG. 26B, the approximate surface $S_{21}$ is calculated on the basis of the pixel values of a larger number of pixels (e.g., $P_4$ to $P_8$) in the approximate region $R_{20}$, compared to the case where the approximate surface $S_{20}$ is calculated. The approximate surface $S_{21}$ has a higher degree of approximation to the approximate region $R_{20}$. Alternatively, an approximate surface may be calculated by using all the pixels in the approximate region $R_{20}$.

The approximate-surface re-calculator 41 includes a weight setting unit 411 that sets a weight to a pixel in the approximate region; and an approximate-function calculator 412 that calculates an approximate function on the basis of the pixel value of the pixel to which the weight has been set.

The weight setting unit 411 includes a difference-value calculator 411a that calculates the difference value $\Delta z$ between the pixel value z of a pixel in the approximate region and the approximate value z' at the coordinates of that pixel on the calculated approximate surface; and a contour-pixel detector 411b that detects a contour pixel in the approximate region. The weight setting unit 411 sets a weight that is assigned to each pixel in the approximate region.

Figure 27:
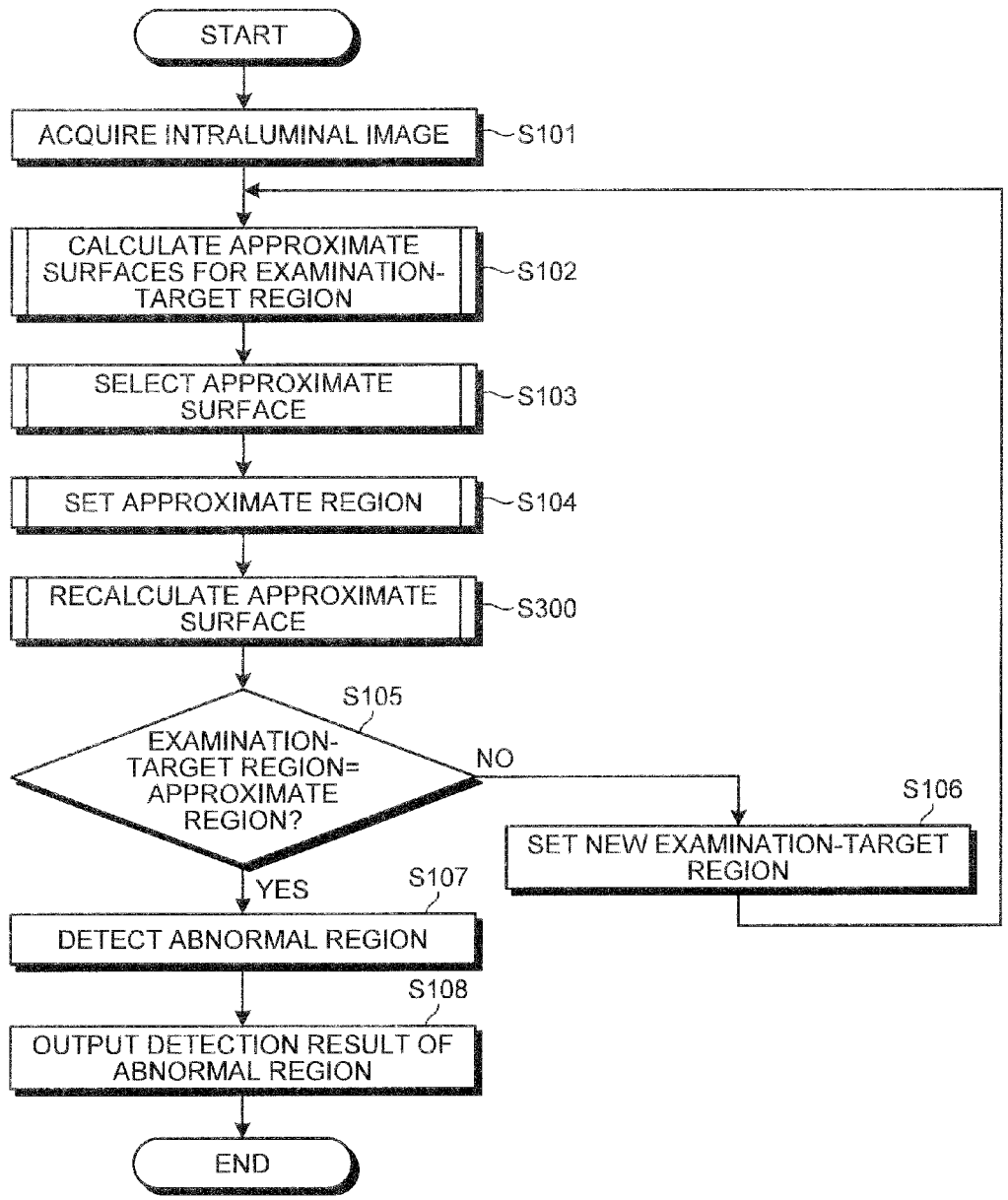
FIG. 27 is a flowchart that illustrates an operation of the image processing apparatus illustrated in FIG. 25.

FIG. 27 is a flowchart that illustrates an operation of the image processing apparatus 3. In the image processing apparatus 3, after an approximate region is set for the selected approximate surface at Step S104, the approximate-surface re-calculator 41 recalculates an approximate surface on the basis of the pixel values of the pixels in the approximate region (Step S300). The operations performed at Steps S101 to S104 and Steps S105 to S109 are the same as those explained for the first embodiment.

FIG. 28 is a flowchart that illustrates an operation of the approximate-surface re-calculator 41.

First, at Step S301, the difference-value calculator 411a calculates the difference value Δz between the pixel value z of a pixel in the approximate region and the approximate value z' at the coordinates of that pixel on the calculated approximate surface (e.g., the approximate surface $S_{20}$ illustrated in FIG. 26A).

At Step 2302, the weight setting unit 411 sets a weight to each pixel in the approximate region in accordance with the absolute value of the difference value Δz. Specifically, the weight setting unit 411 sets a lower weighted value to a pixel that has a higher absolute value of the difference value Δz. This is because, if the pixel value of an abnormal region or noise (i.e., outlier), which can be present in the approximate region, is used, the degree of approximation of the recalculated approximate surface is not increased; therefore, a lower weighted value is set to the outlier. The weighted value may be set to, for example, zero for a pixel for which the difference value Δz has a higher absolute value than a predetermined threshold.

At Step S303, the contour-pixel detector 411b detects a contour pixel in the approximate region by using a known method, such as contour tracking (see page 178, Digital Image Processing, CD-ARTS Society).

At Step S304, the weight setting unit 411 resets weights such that the weight set to a contour pixel is higher than those set to the pixels other than the contour pixels. The reason why the weight set to the contour pixel is higher is that the approximate surfaces for adjacent approximate regions become more continuous.

At Step S305, the approximate-function calculator 412 calculates an approximate function on the basis of the coordinates of the pixels in the approximate region and their pixel values $(x_1, y_1, z_1)$, $(x_2, y_2, z_2)$, ... and the weights $w_1$, $w_2$, ... that are set to the pixels $(x_1, y_1)$, $(x_2, y_2)$, .... A specific method for calculating the approximate function is the same as that explained for the first embodiment. The following matrix wB, which is obtained in consideration of the weights of pixels, is assigned instead of the matrix A in Equation (2).

$$wB = \begin{bmatrix} w_1 x_1^2 & w_1 y_1^2 & w_1 x_1 y_1 & w_1 x_1 & w_1 y_1 & w_1 \\ w_2 x_2^2 & w_2 y_2^2 & w_2 x_2 y_2 & w_2 x_2 & w_2 y_2 & w_2 \\ \vdots & \vdots & \vdots & \vdots & \vdots & \vdots \\ w_n x_n^2 & w_n y_n^2 & w_n x_n y_n & w_n x_n & w_n y_n & w_n \end{bmatrix}$$

At Step S306, the approximate-surface re-calculator 41 assigns the coordinates of all the pixels in the approximate region to the calculated approximate function so as to calculate an approximate value corresponding to each set of coordinates. Thus, a new approximate surface (e.g., the approximate surface $S_{21}$ illustrated in FIG. 26b) is calculated.

As described above, according to the third embodiment, it is possible to calculate an approximate surface that has a higher degree of approximation with respect to the set approximate region. Thus, during an abnormal-region detection process that will be performed later, it is possible to perform high-accuracy detection of an abnormal region that shows a pixel value's change that is different from those in the surroundings.

As described above, according to the first to third embodiments and their modified examples, an approximate surface that approximates the pixel values of pixels included in the examination-target region is acquired, the approximate region approximated by the approximate surface is acquired, and an abnormal region is detected on the basis of the pixel values of pixels in the approximate region and the values at the coordinates of those pixels on the approximate surface, whereby it is possible to perform high-accuracy detection of an abnormal region that shows a pixel value's change that is different from those in the surroundings.

The image processing apparatuses according to the above-described first to third embodiments and their modified examples can be implemented by an image processing program that is recorded in a recording device and executed by a computer system, such as a personal computer or workstation. The computer system to be used may be connected to a device, such as a different computer system or sever, via a public network, such as a local area network (LAN), wide area network (WAN), or the Internet. In such a case, the image processing apparatuses according to the first to third embodiments and their modified examples may acquire image data on an in-vivo image via the above-described network, output an image processing result to various output devices (such as a viewer or printer) connected via the above-described network, or store an image processing result in a storage device (a recording device and its reader, or the like) connected via the above-described network.

The present invention is not limited to the first to third embodiments and their modified examples. Various inventions may be made by combining components disclosed in each embodiment or modified example as appropriate. For example, an invention may be made by using all the components disclosed in each embodiment or modified example from which some of the components are excluded or may be made by combining the components disclosed in the different embodiments and modified examples as appropriate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   an approximate-surface calculator that calculates multiple approximate surfaces for a first pixel, each of the multiple approximate surfaces approximating a pixel value of the first pixel included in an examination-target region of an image;
   an approximate-surface selector that selects at least one approximate surface from the approximate surfaces on the basis of the relation between a pixel value of a second pixel in the examination-target region and the approximate surfaces;
   an approximate-region setting unit that sets an approximate region where a pixel value of a third pixel is approximated by the selected at least one of the approximate surfaces; and
   an abnormal-region detector that detects an abnormal region on the basis of the pixel value of the third pixel in the approximate region and a value at the coordinates of the third pixel on the selected at least one of the approximate surfaces.

2. The image processing apparatus according to claim 1, wherein the approximate-surface calculator includes
   a pixel extracting unit that extracts multiple pixels from the examination-target region, the pixels being used for calculating each of the approximate surfaces, and an approximate-function calculator that calculates an approximate function that includes the coordinates of one pixel of the extracted multiple pixels, as variables, and approximates a pixel value at the coordinates of the one pixel of the extracted multiple pixels.

3. The image processing apparatus according to claim 1, wherein the approximate-surface selector includes
- an approximate-surface close-region detector that detects, for each approximate surface, an approximate-surface close region where the pixel value of the second pixel in the examination-target region is close to a value at the coordinates of the pixel on at least the selected one of the approximate surfaces, and
- an approximate evaluation-value calculator that calculates an evaluation value that indicates the degree of approximation of an approximate surface in the approximate-surface close region, and the approximate-surface selector selects at least one approximate surface from the approximate surfaces on the basis of the evaluation value.

4. The image processing apparatus according to claim 3, wherein the approximate-surface close-region detector includes a difference-value calculator that calculates, for each approximate surface, the difference value between the pixel value of the second pixel in the examination-target region and a value at the coordinates of the pixel on the selected at least one of the approximate surfaces, and compares the difference value with a predetermined threshold so as to detect the approximate-surface close region.

5. The image processing apparatus according to claim 3, wherein the approximate evaluation-value calculator includes a size calculator that calculates the size of the approximate-surface close region as the evaluation value, and the approximate-surface selector selects an approximate surface for which the approximate-surface close region has the largest size.

6. An image processing method comprising:
calculating, using a hardware processor, multiple approximate surfaces for a first pixel, each of the multiple approximate surfaces approximating a pixel value of the first pixel included in an examination-target region of an image;

selecting, using the hardware processor, at least one approximate surface from the approximate surfaces on the basis of the relation between a pixel value of a second pixel in the examination-target region and the approximate surfaces;

setting, using the hardware processor, an approximate region where a pixel value of a third pixel is approximated by the selected at least one of the approximate surfaces; and detecting, using the hardware processor, an abnormal region on the basis of the pixel value of the third pixel in the approximate region and a value at the coordinates of the pixel on the selected at least one of the approximate surfaces.

7. A computer-readable recording device with an executable program stored thereon, wherein the program instructs a processor to execute:

calculating multiple approximate surfaces for a first pixel, each of the multiple approximate surfaces approximating a pixel value of the first pixel included in an examination-target region of an image;

selecting at least one approximate surface from the approximate surfaces on the basis of the relation between a pixel value of a second pixel in the examination-target region and the approximate surfaces;

setting an approximate region where a pixel value of a third pixel is approximated by the selected at least one of the approximate surfaces; and detecting an abnormal region on the basis of the pixel value of the third pixel in the approximate region and a value at the coordinates of the pixel on the selected at least one of the approximate surfaces.

* * * * *